United States Patent
Wong et al.

(10) Patent No.: US 10,810,162 B2
(45) Date of Patent: Oct. 20, 2020

(54) PHYSICAL FILE VERIFICATION

(71) Applicant: EMC IP Holding Company LLC, Hopkinton, MA (US)

(72) Inventors: Tony Wong, Milpitas, CA (US); Abhinav Duggal, Milpitas, CA (US); Ramprasad Chinthekindi, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 298 days.

(21) Appl. No.: 16/034,282

(22) Filed: Jul. 12, 2018

(65) Prior Publication Data

US 2020/0019623 A1 Jan. 16, 2020

(51) Int. Cl.
| | |
|---|---|
| G06F 9/455 | (2018.01) |
| G06F 16/13 | (2019.01) |
| G06F 16/174 | (2019.01) |
| G06F 16/901 | (2019.01) |

(52) U.S. Cl.
CPC ...... *G06F 16/1748* (2019.01); *G06F 9/45558* (2013.01); *G06F 16/137* (2019.01); *G06F 16/9027* (2019.01); *G06F 2009/45579* (2013.01); *G06F 2009/45583* (2013.01)

(58) Field of Classification Search
CPC ............... G06F 16/1748; G06F 16/137; G06F 16/9027; G06F 9/45558; G06F 2009/45583; G06F 2009/45579
See application file for complete search history.

(56) References Cited

U.S. PATENT DOCUMENTS

| | | | |
|---|---|---|---|
| 7,430,560 B1 * | 9/2008 | Mittal | G06F 16/9027 |
| 7,921,088 B1 * | 4/2011 | Mittal | G06F 16/9027 |
| | | | 707/693 |
| 9,317,218 B1 * | 4/2016 | Botelho | G06F 3/0655 |

\* cited by examiner

*Primary Examiner* — Jorge A Casanova
(74) *Attorney, Agent, or Firm* — Staniford Tomita LLP

(57) ABSTRACT

A perfect hash vector (PHVEC) is created to track segments in a deduplication file system. Files are represented by segment trees having hierarchical segment levels. Containers store the segments and fingerprints of segments. Upper-level segments are traversed to identify a first set of fingerprints of each level. These fingerprints correspond to segments that should be present. The first set of fingerprints are hashed and bits are set in the PHVEC corresponding to positions from the hashing. The containers are read to identify a second set of fingerprints. These fingerprints correspond to segments that are present. The second set of fingerprints are hashed and bits are cleared in the PHVEC corresponding to positions from the hashing. If a bit was set and not cleared, a determination is that there is at least one segment missing. If all bits set were also cleared, a determination is that no segments are missing.

18 Claims, 15 Drawing Sheets

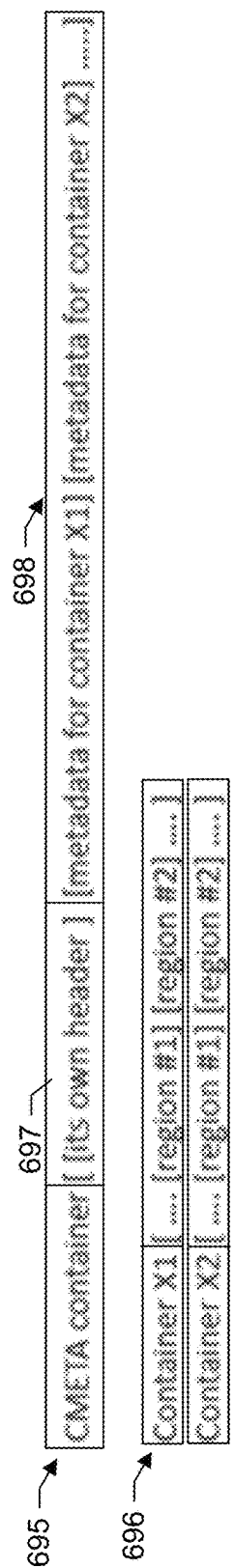
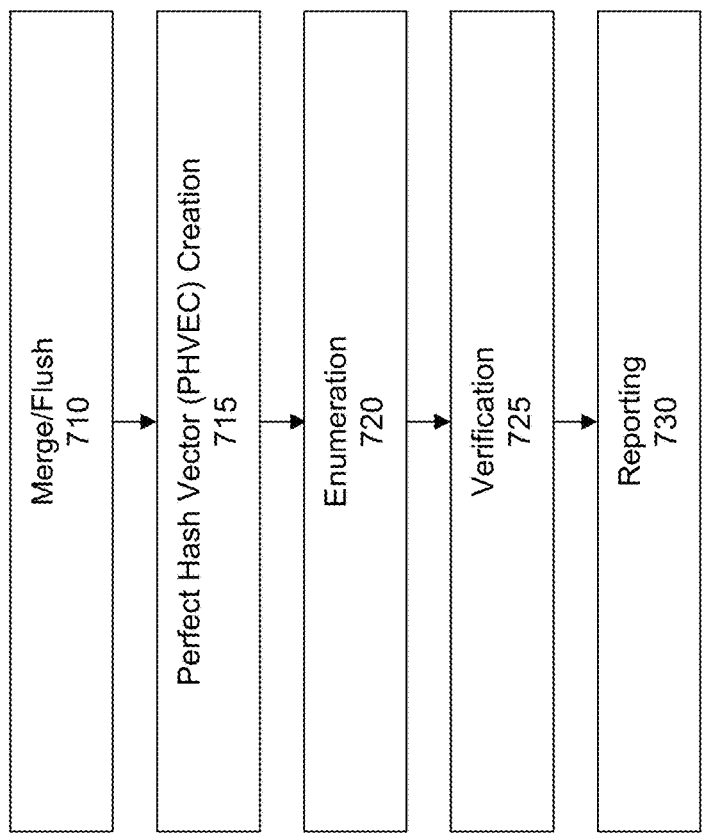
FIG. 6B
FIG. 7

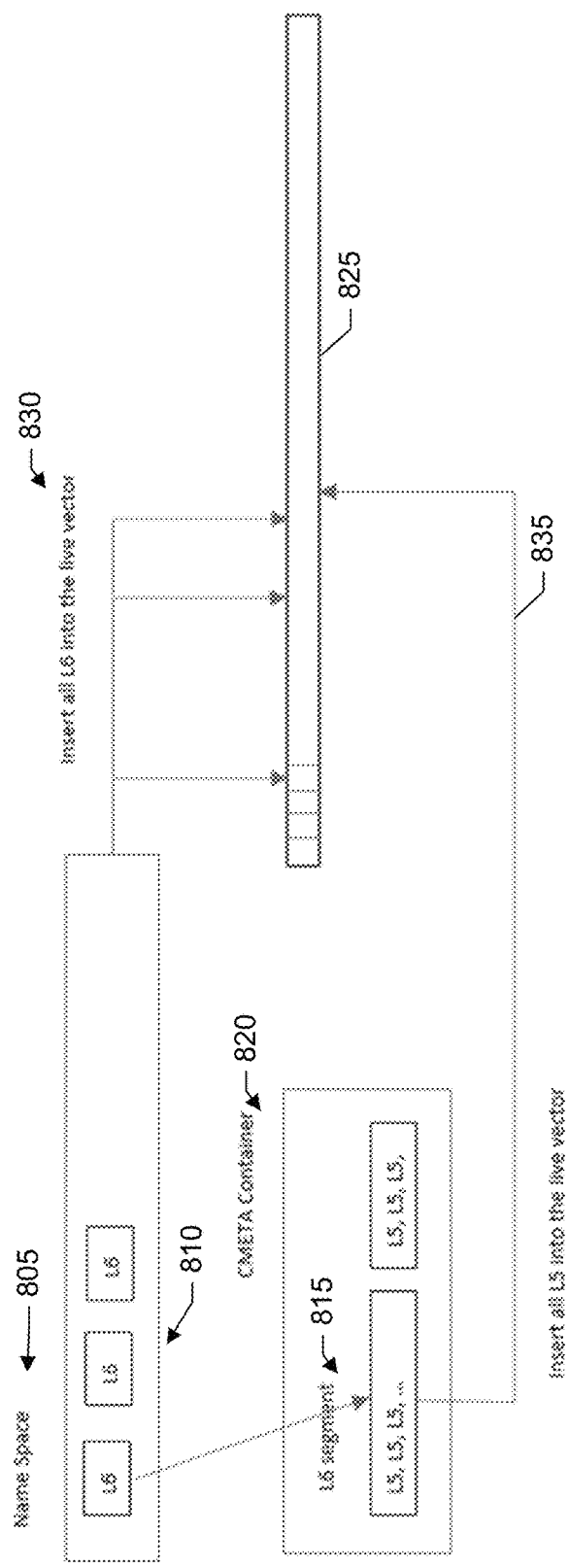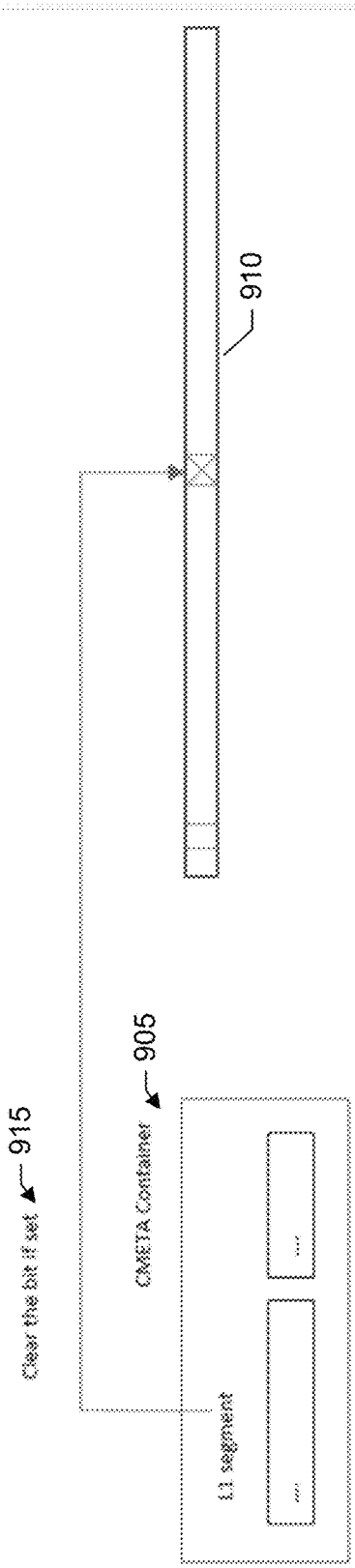
FIG. 8
FIG. 9

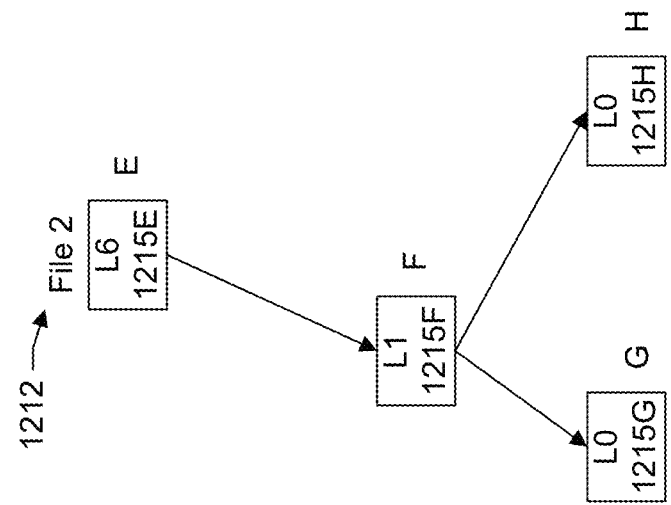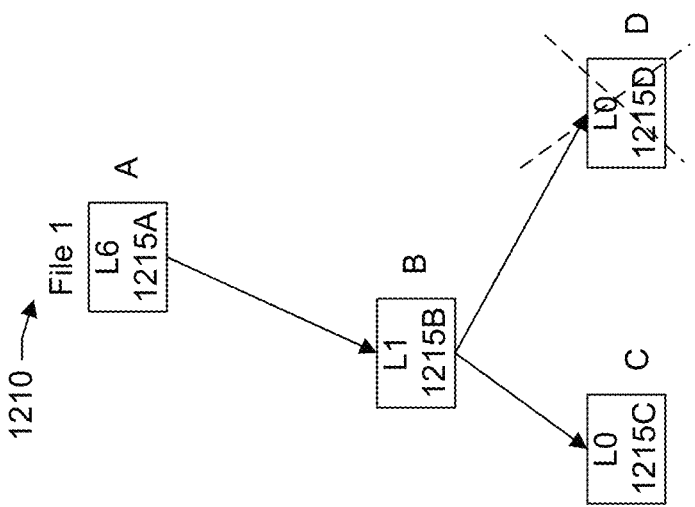
FIG. 12

PHYSICAL FILE VERIFICATION

TECHNICAL FIELD

The present invention relates generally to information processing systems, and more particularly to verifying data content.

BACKGROUND

File verification refers to a process of verifying that a file has all its content and that no data is missing. One reason that data may be missing is because flaws (e.g., bugs) in an application, file system, or other program cause the program or system to behave in unintended ways. The potential for missing data is a particular concern for deduplication file systems. A deduplication file system is much more complex than a non-deduplication file system because in the deduplication file system, there can be many different and complex algorithms to facilitate the sharing of data and reduction of redundant data in the file system. Because of flaws in the system, data may be deleted even though it is still being referenced.

As a result, it is desirable to provide a mechanism to verify content. It is also desirable to be able to detect missing content relatively quickly so that measures can be taken to recover the content and address the flaw. For example, in many cases, by the time a user attempts to read a file, but instead receives a corruption error—it may be too late to recover the file.

Typical verification algorithms involve a file-by-file approach. These algorithms are generally reliable, but the verification process is exceedingly long. A deduplication file system may include millions upon millions of files with many files sharing the same data. If, for example, there are 1000 files sharing the same data, the process to verify those 1000 files is repeated 1000 times even though those files share the same data. The time to complete verification is compounded because pieces of data (including actual data content and metadata) associated with a file may be spread out across many different disk locations. Thus, there can be a large number of IOs and disk seeks during the verification process of a single file. In a large file system, the verification process may take weeks or even months. By the time the verification is complete, it may be too late to recover any missing content.

Therefore, there is a need for improved systems and techniques for efficient and rapid file verification.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 6B shows an example of a CMETA container, according to one or more embodiments.

FIG. 7 shows an overall flow of physical file verification, according to one or more embodiments.

FIG. 8 shows an example of an enumeration process, according to one or more embodiments.

FIG. 9 shows an example of a verification process, according to one or more embodiments.

FIG. 12 shows an example of files being represented by segment trees in a deduplication file system, according to one or more embodiments.

FIG. 15 shows an example of the perfect hash vector in a second state, according to one or more embodiments.

FIG. 16 shows an example of the perfect hash vector in a third state, according to one or more embodiments.

FIG. 17 shows an example of the perfect hash vector in a fourth state, according to one or more embodiments.

FIG. 18 shows an example of the perfect has vector in a fifth state, according to one or more embodiments.

FIG. 19 shows a block diagram of an operation of a perfect hash function, according to one or more embodiments.

FIG. 20 shows an example of a collision in the perfect hash vector, according to one or more embodiments.

FIG. 21 shows another example of a collision in the perfect hash vector, according to one or more embodiments.

DETAILED DESCRIPTION

Figure 1:
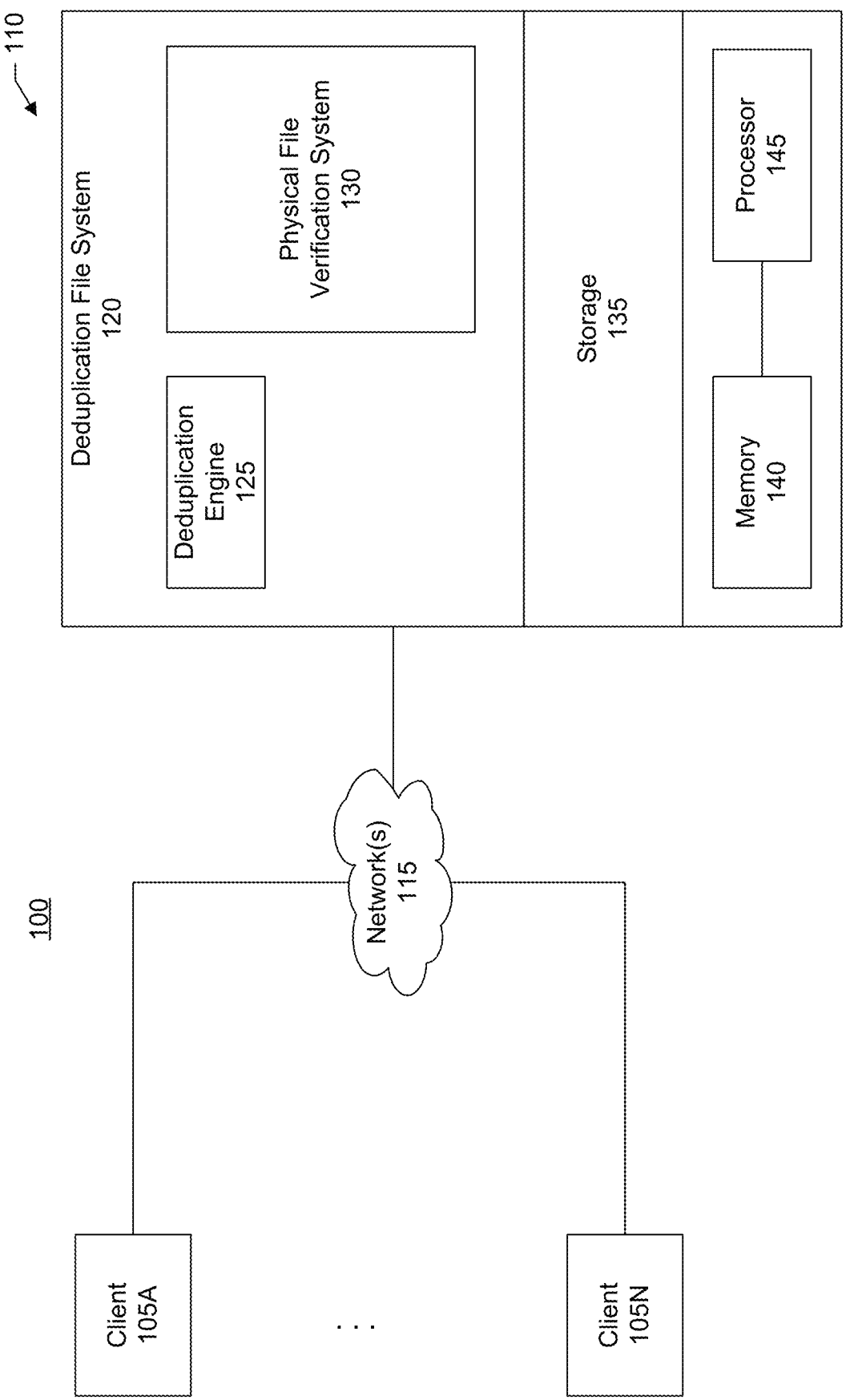
FIG. 1 shows a block diagram of an information processing system comprising a physical file verification system for a deduplication file system, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network.

Disclosed herein are methods and systems for physical file verification in a deduplication file system. A duplication file system is more vulnerable to missing data segment problems than traditional non-deduplication file systems. In a deduplication file system, there are many complex interactions among the data ingest, garbage collection, replication, and migration processes that may result in unintended data corruption. It is important to detect such data corruption as early as possible so that the user can recover the data from another source and the problem can be addressed before any further issues occur. An example of a deduplication file system is Data Domain File System (DDFS) as provided by Dell EMC of Hopkinton, Mass. Although some embodiments may be described in conjunction with DDFS, it should be appreciated that aspects and principles of the systems and techniques described herein can be applied to other deduplication file systems.

FIG. 1 shows a block diagram of a computer network or information processing system 100 in which physical file verification may be implemented. This system includes any number of clients 105A-N, a data storage system 110, and a network 115 connecting the clients and data storage system. The data storage system includes a deduplication file system 120. The deduplication file system includes a deduplication engine 125, a physical file verification system 130, and storage 135. The deduplication engine is responsible for deduplicating data (e.g., files) as it enters the data storage system for storage. The physical file verification system is responsible for helping to ensure the integrity of the data stored in the storage by detecting data corruption or missing data pieces.

The clients may include servers, desktop computers, laptops, tablets, smartphones, internet of things (IoT) devices, or combinations of these. The network may be a cloud network, local area network (LAN), wide area network (WAN) or other appropriate network. The network provides connectivity to the various systems, components, and resources of system 100, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The data generated by the clients may be transmitted over the network for storage in the data storage system. The deduplication file system of the data storage system organizes and manages the data stored within the data storage system. In a specific embodiment, the deduplication file system includes an active tier and a cloud tier. The active tier may include local storage; while the cloud tier includes cloud or remote storage such as may be provided by a cloud storage provider. Examples of cloud storage include Dell EMC Elastic Cloud Storage S3 (ECS) as provided by Dell EMC and Amazon Web Services S3 (AWS) as provided by Amazon, among others. The cloud tier can provide a cost-effective solution for long-term retention of a subset of the data in the file system. The deduplication file system may include a policy engine that moves and writes data from the active tier to the cloud tier once the data reaches a certain minimum age as specified in a policy.

The storage may include storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays. In an embodiment, the storage (e.g., tape or disk array) may represent any practical storage device or set of devices, such as tape libraries, virtual tape libraries (VTL), fiber-channel (FC) storage area network devices, and OST (OpenStorage) devices. The storage may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks.

Hardware components of the data storage system further include memory 140 and a processor 145, coupled to the memory. During operation, a physical file verification program may be loaded into memory. The memory holds program instructions and data accessed by the processor to perform physical file verification among other tasks.

Figure 2:
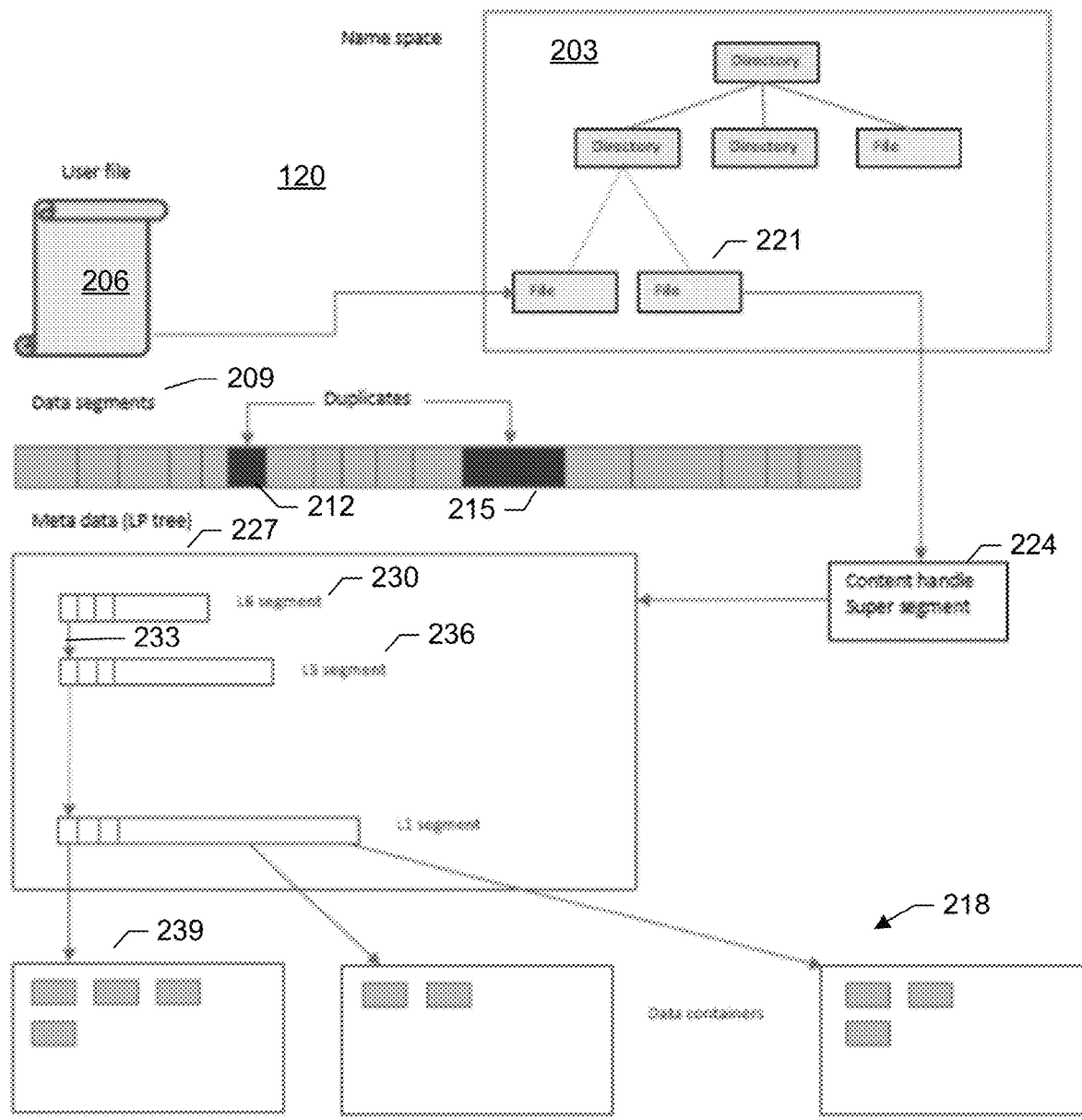
FIG. 2 shows an example of a duplication process, according to one or more embodiments.

FIG. 2 shows a block diagram illustrating a deduplication process of the deduplication file system according to one or more embodiments. As shown in the example of FIG. 2, the deduplication file system includes a name space 203. The name space provides an organizational structure for identifying and organizing the files stored in the file system. In an embodiment, there is a hierarchical organization in which files are organized into directories, subdirectories, and so forth.

As data, such as a user file 206, enters the deduplication file system, it is segmented into data segments 209 and filtered against existing segments to remove duplicates (e.g., duplicate segments 212, 215). A segment that happens to be the same as another segment that is already stored in the deduplication file system may not be again stored. This helps to eliminate redundant data and conserve storage space. Metadata, however, is stored that allows the deduplication file system to reconstruct or reassemble the file using the already or previously stored segment.

Any unique data segments are then stored in fixed size immutable containers 218. A content handle 221 of the file is kept in the file system's name space to support the directory hierarchy. The content handle points to a super segment 224 which holds a reference to a top of a segment tree 227 of the file. The super segment points to a top reference 230 that points 233 to metadata 236 and data segments 239.

In other words, in a specific embodiment, each file in the deduplication file system may be represented by a segment tree. The segment tree includes a set of segment levels arranged into a hierarchy (e.g., parent-child). Each upper level of the segment tree includes one or more pointers or references to a lower level of the segment tree. A last upper level of the segment tree points to the actual data segments. Thus, upper level segments store metadata while the lowest level segments are the actual data segments. In an embodiment, a segment in an upper level includes a fingerprint (e.g., metadata) of fingerprints of one or more segments in a next lower level (e.g., child level) that the upper level segment references.

A segment tree may have any number of levels. The number of levels may depend on factors such as the expected size of files that are to be stored, desired deduplication ratio, available resources, overhead, and so forth. For example, having more levels may reduce the amount of redundant data stored, but may also increase the overhead required to manage the additional levels. Having fewer levels may decrease the overhead, but may also increase the amount of redundant data stored. In a specific embodiment, there are seven levels L6 to L0. L6 refers to the top level. L6 may be referred to as a root level. L0 refers to the lowest level. Thus, the upper segment levels (from L6 to L1) are the metadata segments and may be referred to as LPs. That is, the L6 to L1 segments include metadata of their respective child segments. The lowest level segments are the data segments and may be referred to as L0s or leaf nodes.

Figure 3:
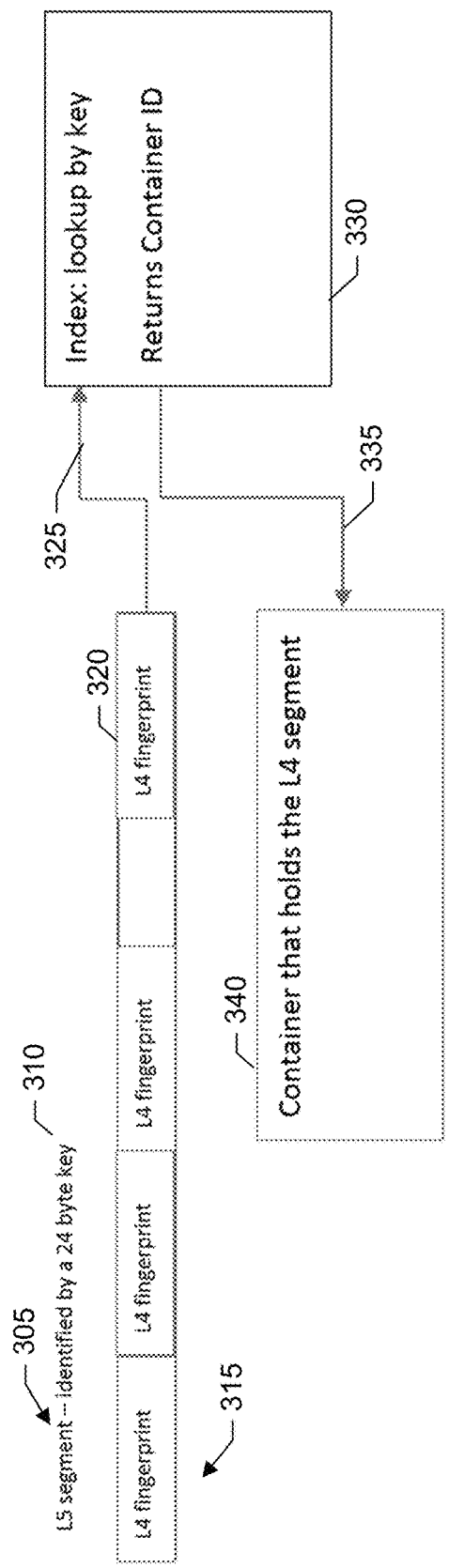
FIG. 3 shows an example of retrieving segments, according to one or more embodiments.

More particularly, in a specific embodiment, every segment in the file system is identified by a 24 byte key (or the fingerprint of the segment), including the LP segments. Each LP segment contains references to lower level LP segments. For example, FIG. 3 shows an L5 segment 305 identified by a fingerprint 310. The L5 segment contains L4 (or below) references 315, which is the key of that L4 segment.

For example, to locate an L4 segment 320, a corresponding L4 key is looked up 325 in an index 330 of the deduplication file system to obtain and return 335 a container identifier (ID) 340 of a container that holds the content of the L4 segment. Thus, the index maps a fingerprint of a segment to a container in which the segment is stored. The index may include a listing of fingerprints of segments and a corresponding listing of container IDs of containers in which a respective segment is stored. The index may be referred to as a fingerprint index. An entry in the index may be formatted as "fp,cid" where "fp" refers to the fingerprint and "cid" refers to the container ID. There can be multiple mappings of the same fingerprint to different containers.

In other words, in a specific embodiment, a segment tree may represent metadata for a file where the L0 segments are the data portions. When a file is received by the deduplication file system, the file is broken or divided into small segments. The segments may be placed into containers and written (e.g., written to disk or other persistent storage). An index maintains a mapping between fingerprints of the segments and the containers in which the segments are stored. The index helps to facilitate deduplication among other things. In particular, if a segment of a file has been written, a fingerprint of the segment is maintained in the index. Thus, a fingerprint of a new segment can be compared to the index. If there is a matching fingerprint, the new segment may not be written, the new segment having been determined to be a duplicate.

Within the deduplication file system, it is desirable to guarantee the integrity among the segments, the segment references, and the fingerprint index. A segment is considered a live segment if it is referenced by another live segment. An L6 segment is live if there is a corresponding file in the name space. To ensure the integrity of the system, it is desirable to ensure that data (e.g., L0 data) is reachable through pointers or metadata.

In a specific embodiment, the deduplication file system maintains or attempts to maintain two invariances. The first invariance specifies that there is a one to one mapping between the (segment, container) pair and the index. The second invariance specifies that a segment should exist if there is a live reference to that segment.

The first invariance or condition allows for checking the index for the existence of a segment, which is generally a very efficient operation.

Inconsistency between the index, segments and its references can occur in the deduplication file system due to hardware failure or software bugs. In various specific embodiments, the deduplication file system automatically performs a logical file verification whenever a file is closed after write. A process of the deduplication file system traverses the segment tree in a depth-first manner to verify the above conditions. However, files written to the cloud tier are not verified due to a lack of system bandwidth. Furthermore, even in the active tier, garbage collection (GC) can cause missing segments after a file is verified and the logical file verification cannot cover this case. It only verifies a file once.

In a specific embodiment, in addition to the logical file verification procedure, the deduplication file system also periodically (during garbage collection procedure) computes the entire index checksum and compares it against the segment checksum. This helps to cover or address the first invariance. For the second invariance, the deduplication file system computes the checksum of all the live references at each segment tree LP level and then it compares against the checksum of all the segments referenced in the next segment tree level (LP−1). However, in some cases, a deduplication file system may not have sufficient memory to include the L0 segments in this procedure. Once an L1 pointer is found to an L0 segment, a random disk seek may again be required to verify the L0 segment because the L0 segment may be at a different disk location than the L1. In other words, for many deduplication file systems, the second invariance is incomplete or not adequately addressed because of the time, processing, and compute resources required to verify.

In some cases, corruption may be detected when a user invokes replication, or reading of a file. By this time, however, it might be too late to recover the corruption. There is a need for systems and techniques for detecting corruption early and reducing the time required to detect corruption.

For example, a logical file verification traverses the segment tree of a file and verifies the consistency in a file-by-file basis. This segment tree depth-first traversal approach can result in very slow random disk input/output (IO). Furthermore, duplication can cause file verification to walk the same segments over and over again. Because of these issues, current file verification techniques can lag behind by weeks or even months. The following examples for virtual synthetic workload and random IO versus sequential IO show why logical file verification can be very inefficient.

Figure 4:
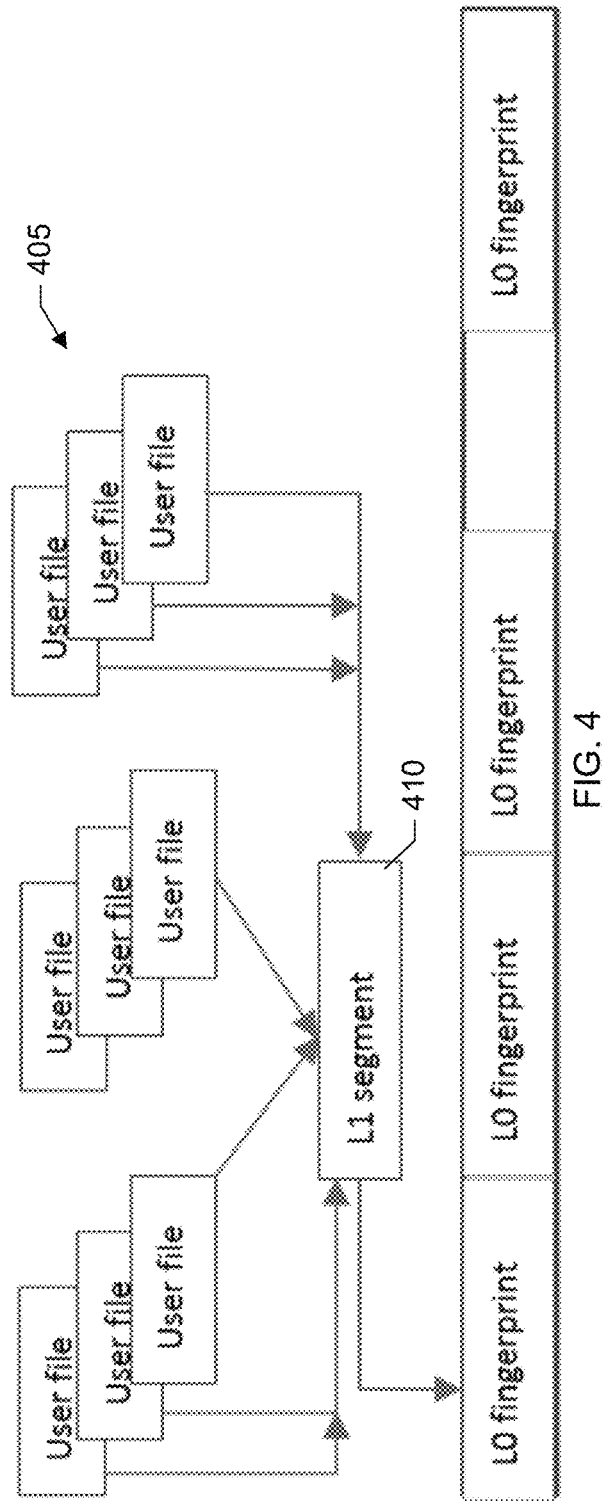
FIG. 4 shows an example of multiple references to a same segment, according to one or more embodiments.

In a virtual synthetic workload, an application filters the duplicate data and only sends the changed block to the file system. There may be a couple different application programming interfaces (API's) to support these kinds of workload but the key commonality is that the LP segments can be shared. For example, FIG. 4 shows a block diagram of many user files 405 referencing a same L1 segment 410. Consider, as an extreme example, that there are 1000 references to the same L1 segment, the logical file verification requires reading the same L1 segment 1000 times over and over again. The physical file verification only reads the segment once!

Figure 5:
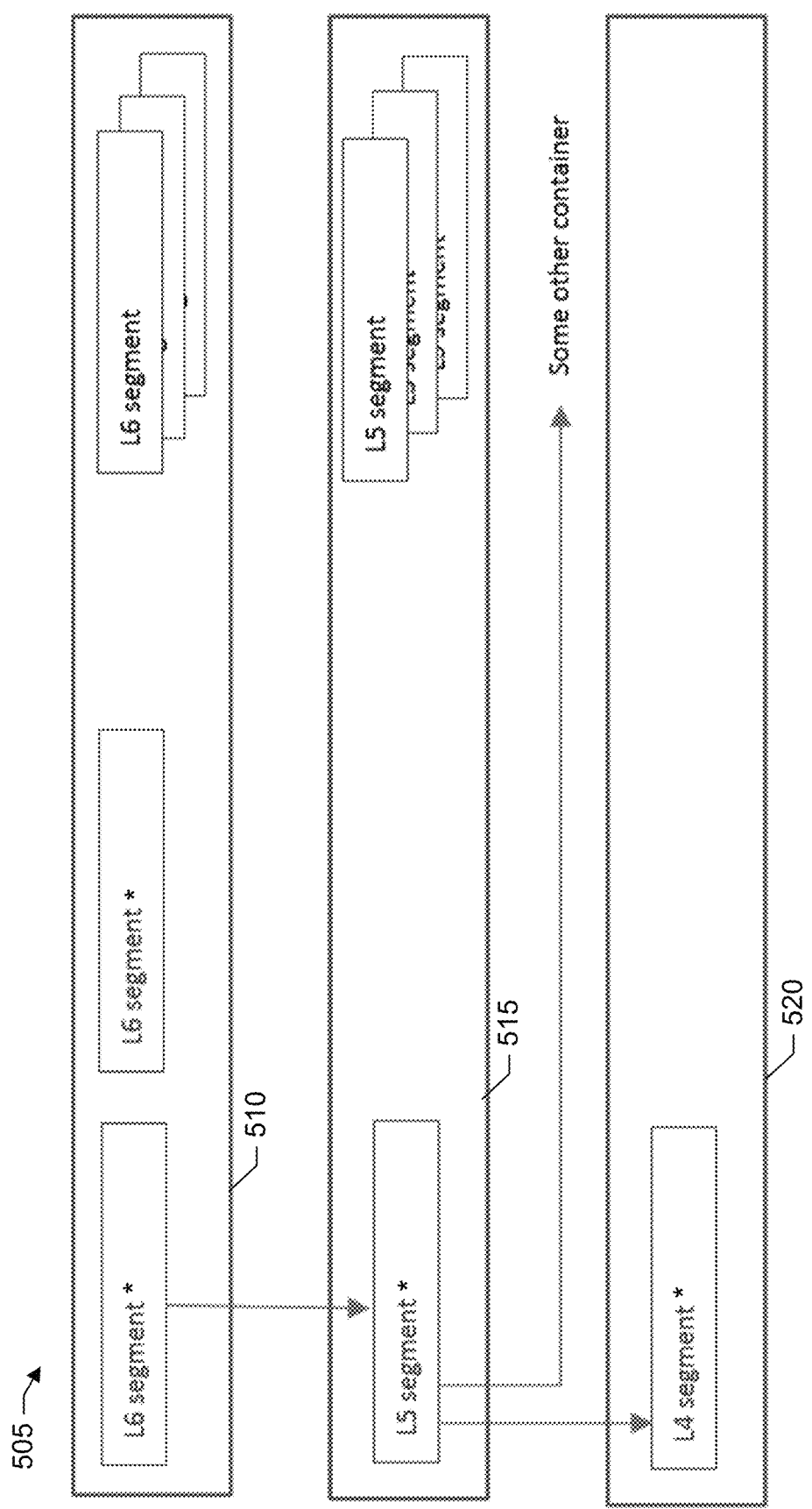
FIG. 5 shows an example of a depth-first traversal, according to one or more embodiments.

Regarding random IO versus sequential IO, in the extreme case, the depth-first LP segment tree traversal can take one random IO for each of its LP segments. Typically, LP segments from different files can be packed together in the same container but the depth-first traversal algorithm will not be able to make use of the rest of the LP segments. For example, FIG. 5 shows a block diagram of a depth-first traversal of a segment tree 505. This segment tree is shown with an L6 segment level 510 having a set of L6 segments, an L5 segment level 515 having a set of L5 segments, and an L4 segment level 520 having an L4 segment.

In the example shown in FIG. 5, only the segments shown with an asterisks ("*") can be used in the depth first traversal and there is a potentially a new random IO for each reference. In a specific embodiment, in a logical file verification, once a file has been verified, it will not be checked again due to its poor performance. However, data can be deleted accidently by the garbage collection process and this kind of corruption will not be detected. On the cloud tier, file verification may not even be enabled due to performance issues.

Thus, the second invariance (that a segment should exist if there is a live reference to that segment) is incomplete or may be only partially addressed. That is, a missing L0 segment can occur without being detected.

Figure 6A:
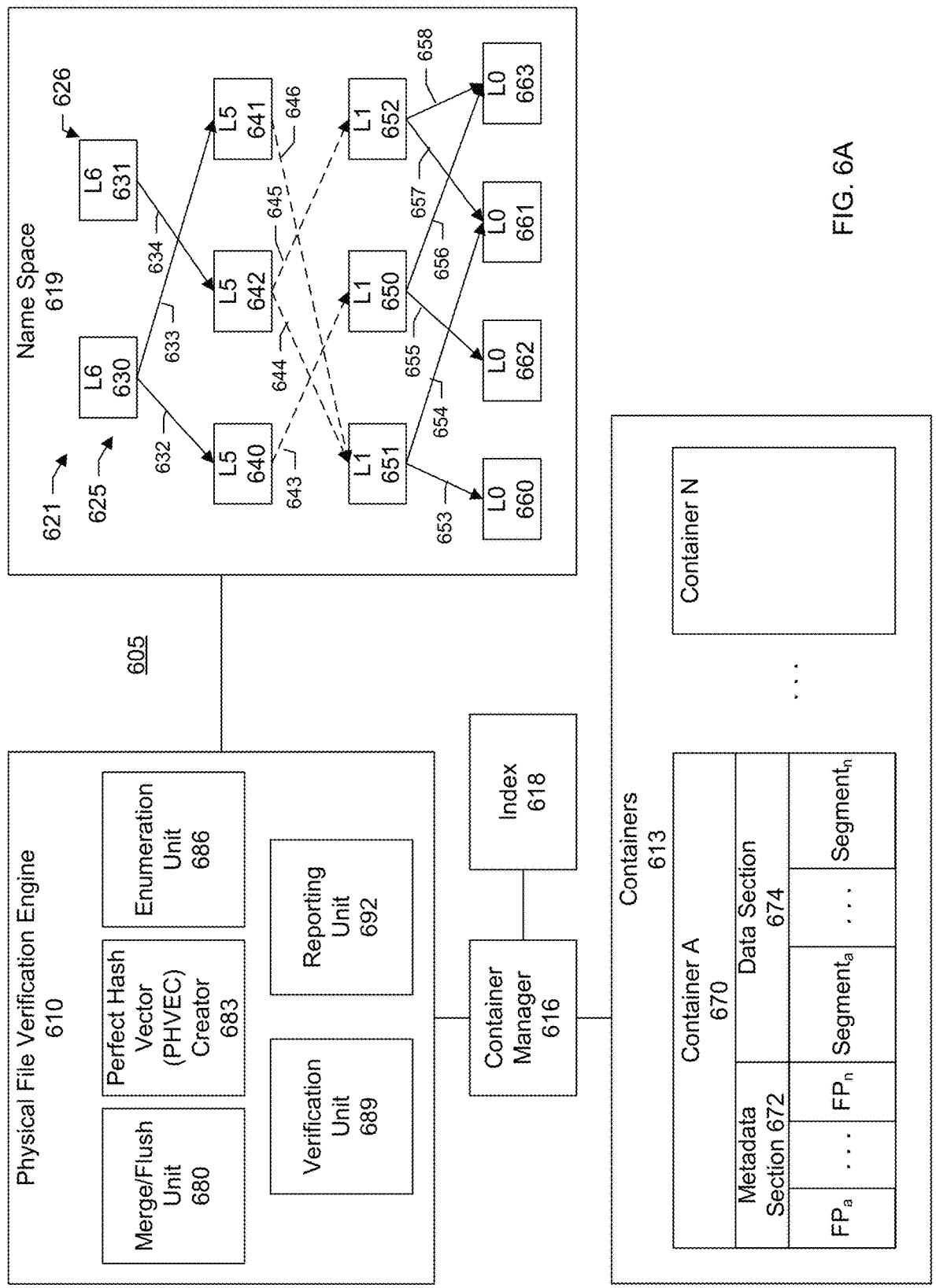
FIG. 6A shows a more detailed block diagram of the physical file verification system, according to one or more embodiments.

FIG. 6A shows a block diagram of a data storage system 605 according to one or more embodiments. The data storage system shown in FIG. 6A may be implemented as part of the data storage system shown in FIG. 1. In a specific embodiment, the data storage system provides physical file verification for the cloud tier. As shown in the example of a FIG. 6A, there is a physical file verification engine 610, a set of containers 613, a container manager 616 between the file verification engine and set of containers, and an index 618. The file verification engine traverses a name space 619 of the deduplication file system to determine or detect whether there are any missing segments, and in particular, whether there are any missing L0 or data segments.

The name space includes a set of segment trees 621 where each file in the deduplication file system is represented by a segment tree. In a specific embodiment, the segment tree is a Merkle tree. A segment tree includes a set of segment levels arranged in a hierarchy. In a specific embodiment, a segment tree can have up to seven levels that may be labeled L6 to L0. For example, one or more intermediate levels may not be present for a relatively small file. A relatively small file may have, in addition to an L0 segment, just an L6 and L1 segment. A relatively large file may have, in addition to an L0 segment, an L6, L5, L4, L3, L2, and L1 segment.

Segments from L6 to L1 are upper level segments that store metadata (e.g., fingerprints) and may be referred to as LP segments. The lowest level segments are the L0 segments which represent actual data content of the file. An upper level segment references one or more lower level segments. Thus, an L6 segment includes an array of L5 references. An L5 segment includes an array of L4 references. An L4 segment includes an array of L3 references. An L3 segment includes an array of L2 references. An L2 segment includes an array of L1 references. An L1 segment includes an array of L0 references.

The example shown in FIG. 6A shows segment levels L6, L5, L1, and L0. Segment levels L4, L3, and L2 have been omitted for purposes of clarity. An L6 segment forms a root or parent. Thus, in the example shown in FIG. 6A, there is a first segment tree 625 having an L6 segment 630 and representing a first file. There is a second segment tree 626 having an L6 segment 631 and representing a second file.

Two or more files may share a same segment. A lower level segment may be referenced by one or more upper level segments. For example, a lower level segment may be referenced by a first upper level segment, and a second upper level segment. The first upper level segment may be from a first segment tree representing a first file. The second upper level segment may be from a second segment tree representing a second file. An upper level segment may reference one or more lower level segments. For example, an upper level segment may reference a first lower level segment and a second lower level segment.

In the example shown in FIG. 6A, L6 segment 630 references L5 segments 640, 641 as shown by arrows 632, 633 from L6 630 to L5 640, 641, respectively. L6 segment

631 references L5 segment 642 as shown by an arrow 634 from L6 631 to L5 642. L5 segment 640 references an L1 segment 650 as shown by an arrow 643 from L5 640 to L1 650. L5 segment 642 references L1 segments 651, 652 as shown by arrows 644, 645 from L5 642 to L1 651, 652, respectively. L5 segment 641 references L1 segment 651 as shown by an arrow 646 from L5 641 to L1 651. The arrows from the L5 to L1 segment level are shown in broken lines to indicate that there can be other intermediate levels between the L5 and L1 levels.

L1 segment 651 references L0 segments 660, 661 as shown by arrows 653, 654 from L1 651 to L0 660, 661, respectively. L1 segment 650 references L0 segments 662, 663 as shown by arrows 655, 656 from L1 650 to L0 662, 663, respectively. L1 segment 652 references L0 segments 661, 663 as shown by arrow 657, 658 from L1 652 to L0 661, 663, respectively.

In a specific embodiment, an upper level segment includes a fingerprint of fingerprints of one or more lower level segments referenced by the upper level segment. For example, L6 segment 630 includes a finger of fingerprints of L5 segments 640, 641. L6 segment 632 includes a fingerprint of fingerprint of L5 segment 642. L5 segment 640 includes a fingerprint of fingerprint of L1 segment 650. L5 segment 642 includes a fingerprint of fingerprints of L1 segments 651, 652. And so forth.

The index includes information mapping a fingerprint to a container that stores a segment corresponding to or representing the fingerprint. Thus, based on a fingerprint of a segment in a current level, a container in which the segment is stored can be obtained from a lookup of the index. Based on the metadata or the data section of the container in which the current level segment is stored, the one or more lower level or child segments referenced by the current level segment can be identified.

More particularly, as shown in the example of FIG. 6A, the containers, such as a container 670 includes a metadata section 672 and a data section 674. The metadata section stores fingerprints. The data section stores segments corresponding to the fingerprints stored in the metadata section. The segments may be compressed into one or more compression regions of the container. Containers 613 are examples of containers on the active tier of the deduplication file system. On the active tier, each container includes a metadata section that describes the fingerprints and their location in the container, then regions of data: "container: [[metadata section] [region #1] [region #2] . . . ]."

The cloud tier of the deduplication file system, however, is generally slower than the active tier. Reading in the cloud a container to find out what fingerprints the container contains can be very slow. Thus, in a specific embodiment, user data is stored in the cloud tier, but not the metadata. In this specific embodiment, there is a type of container that may be referred to as a CMETA container.

FIG. 6B shows an example of a format of a CMETA container 695 and corresponding data containers 696. The CMETA container may be maintained on local storage and the corresponding data containers may be maintained on cloud storage. As shown in the example of FIG. 6B, the CMETA container includes a header 697 and metadata sections 698 of multiple data containers 696. The CMETA container stores the metadata section of multiple data containers, e.g., two or more data containers. For example, a CMETA container may include first metadata associated with a first data container, second metadata associated with a second data container, and so forth. In a specific embodiment of a deduplication file system having a cloud tier, rather than writing the metadata in a container on the cloud tier, the metadata is stored in a CMETA container that is kept on local storage so that the metadata sections can be read locally and without having to read from the cloud.

Referring back now to FIG. 6A, In a specific embodiment, the deduplication file system includes a log-structured file system (LFS). A log-structured file system writes modifications to disk sequentially in a log-like structure. In other words, the disk may be used as a log in which writes are made to an end of the log. Managing the disk as a log can help to speed file writing as compared to other file systems, such as journaling file systems, in which several disk seeks may be required to add a block of data. Since disk space is finite, however, file systems having a log-structured file system also provide a mechanism to reclaim or recover disk space. This space recovery mechanism may be referred to as a garbage collector. The responsibility of the garbage collector is to periodically review the file system and recover free space by removing or deleting old segments. Because of problems such as a bug in the garbage collection process, a segment, such as an L0 segment may be accidentally deleted and thus missing even though there was a reference pointing to it. That is, a live L0 segment may be missing because it was inadvertently deleted. In an embodiment, systems and techniques are provided to efficiently and quickly detect whether or not there are any missing live L0 segments.

In a specific embodiment, there is a first assumption that the deduplication file system has already verified the first invariance, i.e., that there is a one-to-one mapping between the (segment, container) pair and the index. In this specific embodiment, there is further a second assumption that the deduplication file system has partially verified the second invariance for all the LP's except L0 segments. Therefore, in this specific embodiment, systems and techniques are provided to detect missing live L0 segments. These systems and techniques can be applied to the cloud tier. In another specific embodiment, these systems and techniques may be applied to the active tier.

In this specific embodiment, since consistency between segments and indices has been assumed to be verified as discussed above, the second invariance may be restated or is equivalent to: "the fingerprint should exist in the index if there is a live reference."

The physical file verification engine includes several components including a merge/flush unit 680, perfect hash vector (PHVEC) creator 683, enumeration unit 686, verification unit 689, and reporting unit 692. It should be appreciated that the components and modules shown in FIG. 6A may be functional and there can be many different hardware and software configurations.

The components of the verification engine shown in FIG. 6A correspond to the five phases in which the physical file verification procedure is performed. FIG. 7 shows an overall flow of the phases. In brief, a first phase 710 includes a merge/flush. A second phase 715 includes creation of the perfect hash vector. A third phase 720 includes an enumeration. A fourth phase 725 includes a verification. A fifth phase 730 includes reporting.

In a specific embodiment, during merge/flush phase, all outstanding input/output (IO) activities are flushed to the cloud tier and then no further 10 access is allowed. All the metadata and L0 segments should be persisted after this step.

During the PHVEC phase, a perfect hash vector is created to track all the live references. The perfect hash vector may be referred to as a live vector. Fingerprints are read from the index buckets for the creation of the PHVEC. The size of the PHVEC may be chosen such that: Total number (#) of keys/Total number (#) of bits in PHVEC=0.7.

The above ratio may be referred to as the load factor of the PHVEC. The PHVEC creation time will increase dramatically if the load factor approaches 1. The creation time will be very short for smaller load factors. A load factor of 0.7 is an arbitrary choice that has shown good performance and efficient use of memory space.

A property of the PHVEC is such that there is no collision in the PHVEC. However, in order for this property to apply, a pre-requisite is that the keys or fingerprints to be hashed must be known. In this specific embodiment, the PHVEC is created based on fingerprints from the index. Thus, foreign keys (corresponding to missing segments), which are also missing in the index (according to assumption of the first invariance—that there is a one-to-one mapping between the (segment, container) pair and the index), can collide with a live reference or some unused bits in the PHVEC.

If the missing segment collides with an unused bit, the corruption will be detected. However, if the missing segment collides with some other live reference, the corruption will not be detected. Thus, in a specific embodiment, to increase the probability or chance of catching the missing segments, the normal load factor of 0.7 is not be used. Instead, in this specific embodiment, an amount of memory greater or substantially greater than an amount of memory required to track all present segments in the deduplication file system (as indicated in the index) is allocated for the PHVEC. In a specific embodiment, all the available memory is allocated for the PHVEC. The load factor can be reduced to 0.1 or less, depending on the number of keys and the amount of available memory. This helps to reduce the probability that a missing segment will collide with a live reference and thus be undetected.

For example, if the load factor is 0.1, the valid keys occupy only 10 percent of the PHVEC bits and the probability that a foreign key will collide with a valid key is only 10 percent. In a specific embodiment, based on the memory configuration and maximum capacity of all the platforms, the memory may be assumed to be large enough to support a live vector for the maximum number of fingerprints.

FIG. 8 shows a block diagram of an example of an enumeration process according to one or more embodiments. As shown in the example of FIG. 8, in a name space 805, there are a set of L6 segments 810 referencing L5 segments 815. As discussed, the segments are stored in containers 820. In a specific embodiment, a type of container may be referred to as a CMETA container.

A PHVEC or live vector 825 has been created. In a specific embodiment, the enumeration includes iterating all the files in the name space and inserting 830 the L6 references into the live vector. Iterating all the L6 containers, if the L6 segment's fingerprint is set in the live vector, reading all its contents (L5 or below references) and inserting them 835 into the live vector. The above process is repeated for the L5, L4, L3, L2, and L1 segments. For the cloud tier, all the metadata (L6 to L0) are all kept in the CMETA containers. In a specific embodiment, it suffices to scan all the CMETA containers for the metadata information.

FIG. 9 shows a block diagram of an example of a verification process according to one or more embodiments. As shown in the example of FIG. 9, there is a container 905 storing an L1 segment and corresponding fingerprint, and a live vector 910. In a specific embodiment, the verification is similar to the enumeration procedure. All the CMETA containers are scanned. The difference is that instead of inserting the contents of the segments into the live vector, the fingerprint of the segment itself is removed from the live vector. Because of the partial second invariance assumption, all the LP segments should be cleared. For the L0 segments, the CMETA container also contains the metadata of the L0 data containers. In a specific embodiment, there is an assumption that the existence of the L0 metadata implies the existence of the L0 segment in the cloud. If stronger verification is desired, an extra existence check to the cloud may be performed.

If there is no missing L0 segment, at the end of the verification phase, the entire live vector should be 0, i.e., each live reference bit should have been cleared 915 because of the existence of the corresponding segment.

If there is one missing segment and the load factor of the live PHVEC is p, the probability that the missing segment will be detected is 1−p, i.e., the probability that the fingerprint of the missing segment does not collide with other keys.

Typically, data corruption occurs at a much larger granularity than just one specific fingerprint. For example, assuming n segments in the same file are corrupted, the probability that at least one of them will be detected=$1-(p)^n$. If n=4, p=0.5, this probability is equal to 0.94. As the number of corrupted segments increases, it is almost certain that the problem will be caught.

The random seeds used to generate the PHVEC may also be randomized to ensure that different sets of hash functions are generated on a different verification run. If the probability that a missing segment is not detected in a single verification run is q, then the probability that it can be detected after n verification run is $1-(q)^n$—again converges to 1 as n increases.

Because the physical file verification algorithm is not 100 percent deterministic, once data corruption is detected, other more time consuming and comprehensive tools can be used to identify all the affected files in the system.

In a specific embodiment, there can be a cloud object existence test. To complete the physical file verification, each time the fingerprint of a live segment is removed from the live PHVEC, its existence in the cloud should be verified. However, there is cost and latency involved in such transactions and it can be very complicated to implement an optimized algorithm. In a specific embodiment, it is assumed that a single object existence query will be issued to the cloud provider.

For the reporting, if there are bits not cleared in the PHVEC, they must not exist in the system and there is a reference to them. Therefore, those are missing segments. However, some additional operations are required to map the bits in the PHVEC to the missing fingerprints and more importantly, the corrupted files. In a specific embodiment, the CMETA containers are scanned again to map the missing bits back to the fingerprints.

In a specific embodiment, L0 metadata is read from the CMETA containers. If the corresponding bit position is set, the fingerprint is saved for reporting. Then all the L1 segments are scanned and if it contains any fingerprints set in the live PHVEC, the fingerprint of the L1 segment itself will be inserted back to the live PHVEC. This process will be repeated for L2, L3, . . . and the L6 segments. Finally, the name space is traversed to identify the files with the corresponding L6 bit set in the live PHVEC.

Since there can be collisions in the PHVEC, it can be possible that some missing fingerprints will not be detected. Other procedures, e.g., logical file verification, can be invoked to perform a more comprehensive verification.

However, if there are multiple segment corruptions in a file, this probabilistic physical file verification algorithm will be able to identify the file with a very high probability.

Figure 10:
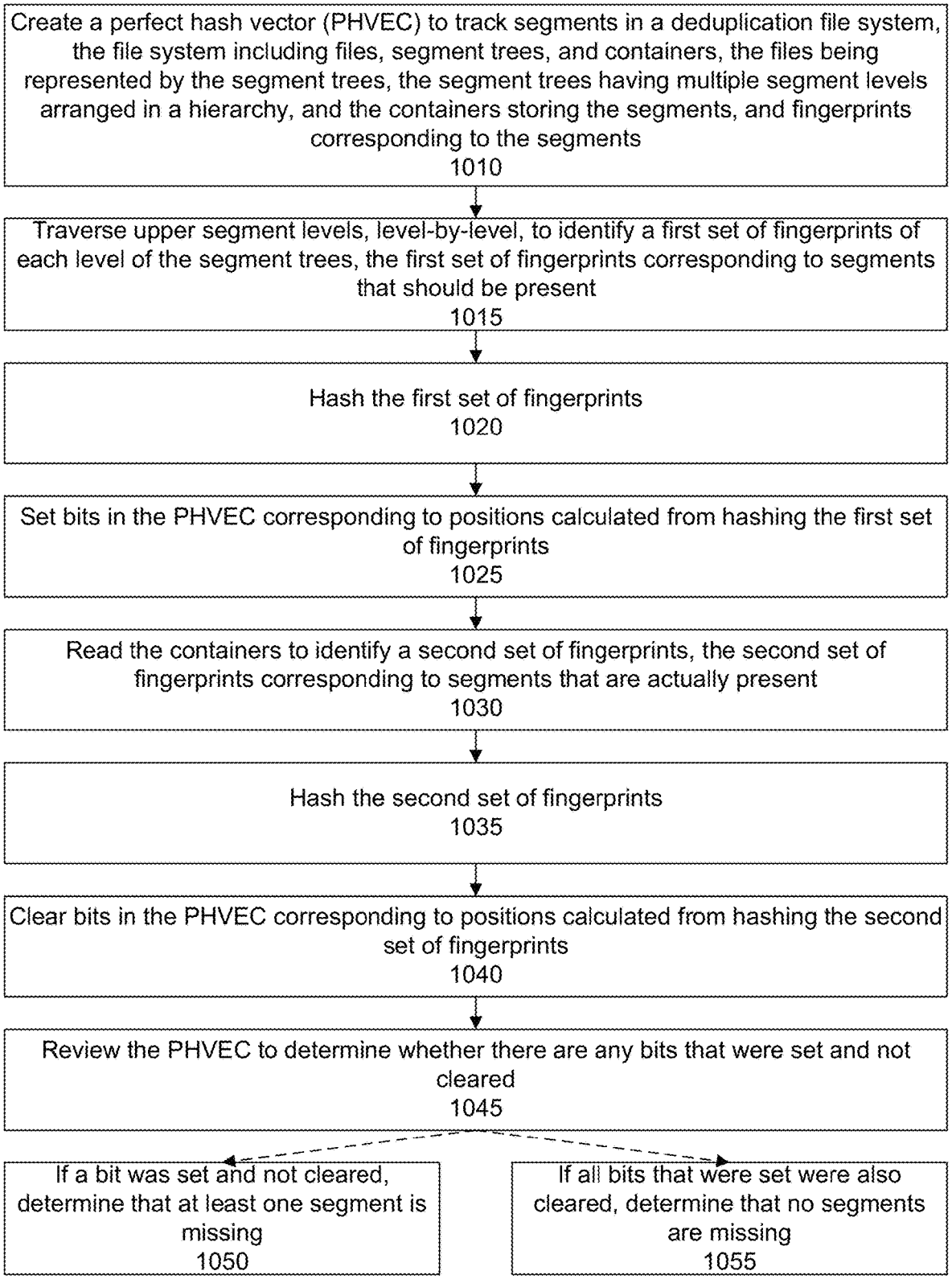
FIG. 10 shows a more detailed flow of physical file verification, according to one or more embodiments.

FIG. 10 shows a flow diagram of a process for physical file verification according to one or more embodiments in further detail. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 1010, a perfect hash vector is created to track segments in a deduplication file system that includes files, segment trees, and containers. The files are represented by the segment trees which have multiple segment levels arranged in a hierarchy. The containers store the segments and fingerprints corresponding to the segments.

For example, a first container may include a metadata section and a data section. The metadata section stores a first set of fingerprints. The data section stores a first set of segments. Each fingerprint of the first set of fingerprints stored in the metadata section has a corresponding segment of the first set of segments stored in the data section; and vice-versa. That is, each segment of the first set of segments stored in the data section has a corresponding fingerprint of the first set of fingerprints stored in the metadata section.

Similarly, a second container may include a metadata section and a data section. The metadata section of the second container stores a second set of fingerprints. The data section of the second container stores a second set of segments. Each fingerprint of the second set of fingerprints stored in the metadata section has a corresponding segment of the second set of segments stored in the data section; and vice-versa. That is, each segment of the second set of segments stored in the data section has a corresponding fingerprint of the second set of fingerprints stored in the metadata section. And so forth.

A container may or may not store segments of a particular level of the segment tree. For example, a container may store segments of a particular level and segments of other levels may be stored in different containers. In a specific embodiment, the containers store segments that are actually present in the deduplication file system.

In a specific embodiment, the deduplication file system further includes an index mapping fingerprints of segments to containers in which the segments are stored. The index may be a fingerprint-to-container identifier (FP/CID) index that maps a particular fingerprint to a container that stores a segment corresponding to the particular fingerprint. In a specific embodiment, the index includes fingerprints of all segments that are actually present in the deduplication file system; fingerprints of segments that should be present—but are not present because the segments are missing—are excluded, omitted, or not in the index.

Figure 11:
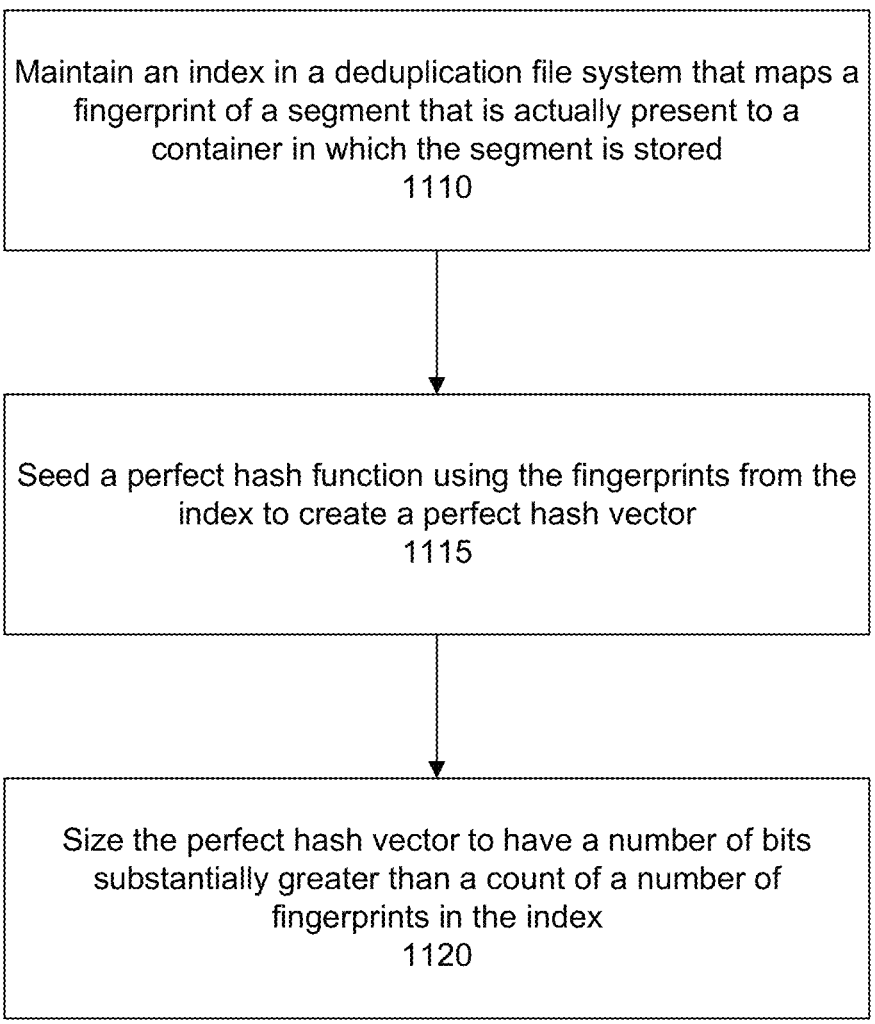
FIG. 11 shows a flow for creating a perfect hash vector, according to one or more embodiments.

FIG. 11 shows further detail of a flow for creating the perfect hash vector. In a step 1110, an index is maintained in the deduplication file system. The index maps a fingerprint of a segment that is actually present to a container in which the segment is stored. In a step 1115, a perfect hash function is seeded using the fingerprints from the index to create the perfect hash vector.

In a step 1120, the perfect hash vector is sized to have a number of bits or entries substantially greater than a count or number of fingerprints in the index. A bit has a single binary value, either 0 or 1. The sizing helps to decrease probability of collisions with used bits. In other words, the sizing helps to increase a probability that a fingerprint of a missing segment will map to a bit position in the perfect hash vector that is not also mapped to a fingerprint of a segment that is present. An amount of memory allocated to the perfect hash vector may be substantially greater than an amount of memory required to track or uniquely represent the fingerprints in the index. In a specific embodiment, a method may include determining an amount of memory required to track the fingerprints in the index, and requesting an amount of memory substantially greater than the amount of memory required to track the fingerprints, where the tracking includes storing a binary value associated with a fingerprint.

Consider, as an example, a deduplication file system as shown in FIG. 12. For purposes of explanation, this file system is shown with two files. A first file is represented by a first segment tree 1210. A second file is represented by a second segment tree 1212. The first segment tree includes four segments including an L6 segment 1215A, which references an L1 segment 1215B, which references an L0 segment 1215C and an L0 segment 1215D.

The second segment tree four segments including includes an L6 segment 1215E, which references an L1 segment 1215F, which references an L0 segment 1215G and an L0 segment 1215H. Assume, for example, that L0 segment 1215D is missing a shown by an "X" that is superimposed over L0 segment 1215D. Thus, the goal of the verification algorithm is to detect that a segment is missing.

Figure 13:
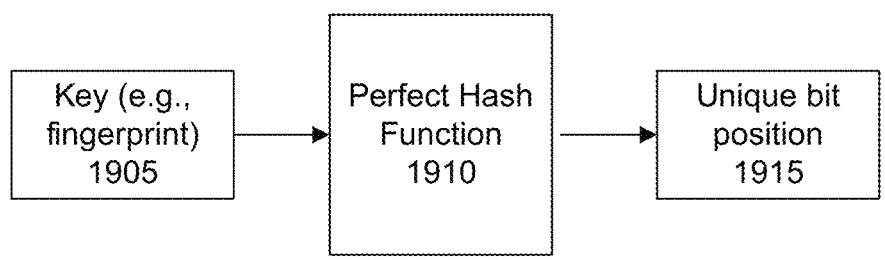
FIG. 13 shows an example of a perfect hash vector in an initial or first state, according to one or more embodiments.

FIG. 13 shows an example of a perfect hash vector 1305 that may be created to track the segments. FIG. 13 shows the perfect hash vector in an initial state or first state.

Referring back now to FIG. 10, in a step 1015, upper segment levels of the segment trees are traversed, level-by-level, to identify a first set of fingerprints of each level of the segment trees. These first set of fingerprints correspond to segments that should be present or should exist in the deduplication file system. In a step 1020, the first set of fingerprints are hashed using the perfect hash function. In a step 1025, bits are set in the perfect hash vector corresponding to positions calculated from hashing the first set of fingerprints. Steps 1015-1025 may be performed as part of the enumeration phase.

The level-by-level traversal or level-by-level walk may be referred to as breadth-first or a physical garbage collection (GC). In a breadth-first approach, all segments in a particular level may be traversed before advancing to a next level. The breadth-first approach is the opposite of a depth-first approach in which each segment tree representing a file is traversed from a top level to a next lower level in a file-by-file manner. Thus, in a depth-first approach, a segment may be traversed multiple times as the segment may be referenced by multiple files.

A breadth-first approach, however, allows for traversing a segment a single time even though the segment may be referenced by multiple files. The breadth-first approach further reduces the number of random seeks that must be performed in favor of sequential seeks. For example, rather than reading a small portion of a container at one level and then jumping to read another small portion of another container at another level (which may involve many random seeks), a greater portion of the container is read at a particular time. IO can be made sequential because the containers can be read in physical order—independent of files. In a specific embodiment, containers are read by starting with the lowest container ID and progressing forward with increasing container IDs. Accessing the containers is thus very efficient since the containers should be located in the same increasing order on the hard disk. A breadth-first approach provides for efficient IO use because a much greater portion of information stored in a container is read and used after a random seek is performed to retrieve the container as compared to the depth-first approach.

Figure 14:
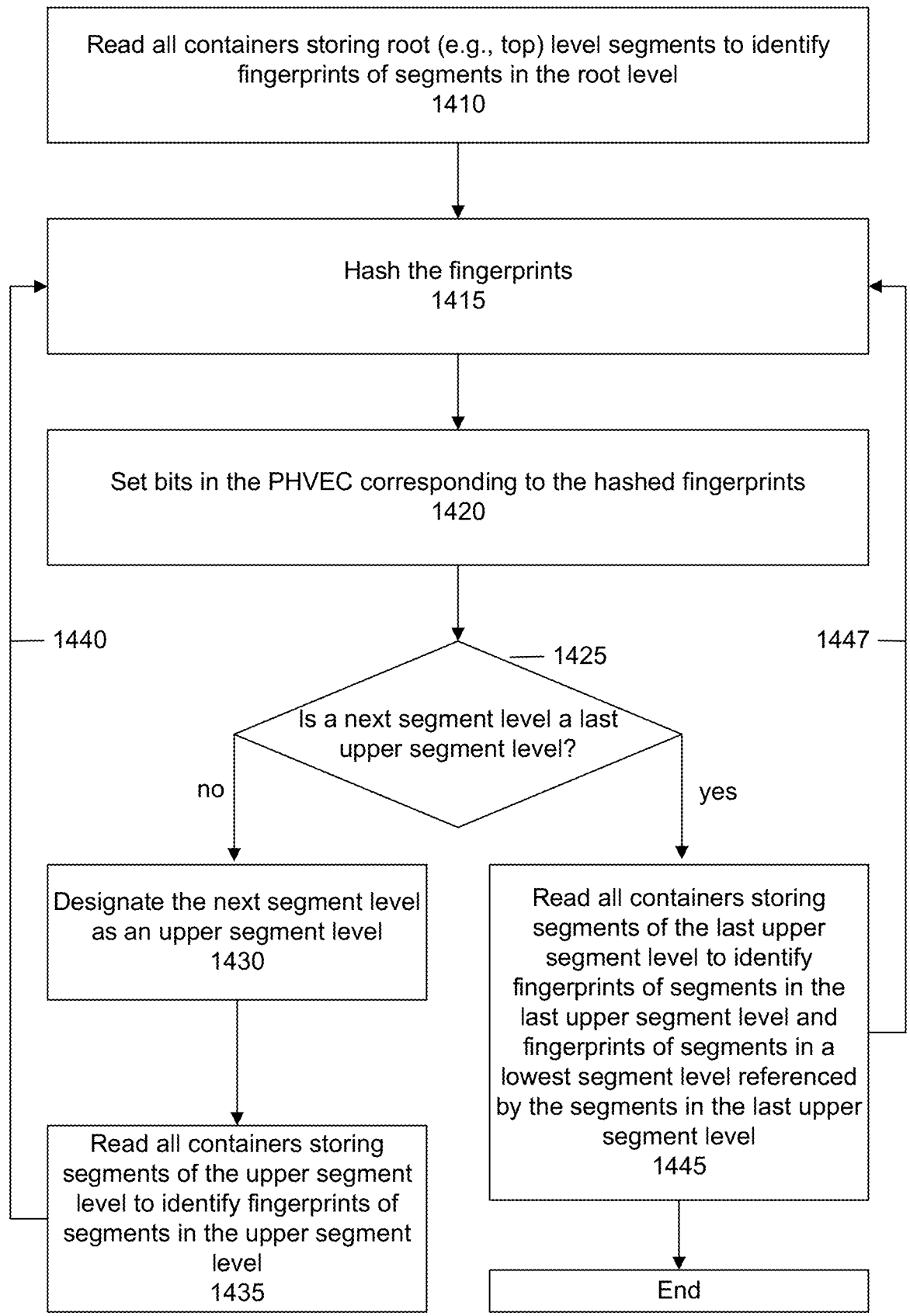
FIG. 14 shows a flow for enumeration, according to one or more embodiments.

FIG. 14 shows a further detailed flow of the enumeration according to one or more embodiments. In a step 1410, all containers storing root or top level segments are read to identify fingerprints of segments at the root level (e.g., L6 segments).

In a step 1415, the fingerprints are hashed using the perfect hash function. In a step 1420, bits are set in the perfect hash vector corresponding to the hashed fingerprints. The traversal of the levels to identify and hash the fingerprints and set the perfect hash vector continues for each of the upper segment levels.

For example, in a step 1425, a determination is made as to whether a next segment level is a last upper segment level. If the next segment level is not the last upper segment, the next segment level is designated an upper segment level (step 1430) and all containers storing segments of that particular upper segment level are read to identify fingerprints of segments of that particular upper segment level (step 1435). The process then loops back up 1440 to hashing the fingerprints using the perfect hash function (step 1415) and setting bits in the perfect hash vector corresponding to the hashed fingerprints (step 1420).

If the next segment level is the last upper segment level, in a step 1445, the process reads all containers storing segments of the last upper segment level to identify fingerprints of segments in the last upper segment level and fingerprints of segments in a lowest segment level, where the segments in the lowest segment level have been referenced by the segments in the last upper segment level. These references can be identified because segments in the last upper segment level include references (e.g., fingerprints) to segments in the lowest segment level (e.g., L0). In other words, in a specific embodiment, the verification process walks to only the L1 segment level because when the walk arrives at the L1 level, the L0 references can be identified from the L1 segments as the L1 segments reference L0 segments.

As discussed, walking the system level-by-level (e.g., reading all L6 containers, then reading all L5 containers, and so forth) helps to reduce the number of random seeks as compared to a depth-first traversal. In a level-by-level or breadth-first approach, a random seek may be performed only up to the container. Once the container is obtained, the IOs may be sequential because the LPs may be laid out together in the container. Moreover, container access is efficient because, as discussed above, the containers may be read sequentially. The time to retrieve data with a random seek is generally much longer as compared to a sequential seek. To access a block on a disk drive, the disk actuator arm has to move the head to the correct track (the seek time), then the disk platter has to rotate to locate the correct sector (the rotational latency). This mechanical action takes time. If a next block to be accessed is at a different location, it will again take time to move the head and disk platter. Further, in a depth-first approach, only small portions of a container may be read at various times and, as a result, there can be many more random seeks that are performed as compared to a breadth-first manner.

Referring back now to FIG. 12, a traversal of the root or top level (e.g., L6 segments) identifies fingerprints corresponding to segments L6 1215A, 1215E, respectively (step 1410—FIG. 14). The fingerprints are hashed using the perfect hash function and bit positions in the perfect hash vector are set according to the hashed fingerprints (steps 1415, 1420—FIG. 14).

FIG. 15 shows the perfect hash vector in a second state, after the first state. In this second state, bits at positions 3 and 7 (corresponding to segments L6 1215A, 1215E, respectively) have been set as indicated by the binary value 1 in the bit positions.

Referring back now to FIG. 12, the next upper segment level is likewise traversed. Specifically, in this example, a traversal of the next upper segment level (e.g., L1 segments) identifies fingerprints corresponding to segments L1 1215B, 1215F, respectively. The fingerprints are hashed using the perfect hash function and bit positions in the perfect hash vector are set according to the hashed fingerprints (steps 1415, 1420—FIG. 14).

FIG. 16 shows the perfect hash vector in a third state, after the second state. In this third state, bits at positions 9 and 10 (corresponding to segments L1 1215B, 1215F, respectively) have been set as indicated by the binary value 1 in the bit positions.

Referring back now to FIG. 12, the L1 segment level happens to be the last upper segment level. As discussed, segments in the last upper segment level reference segments in the lowest segment level (e.g., L0). Thus, in the example of FIG. 12, a traversal of the last upper segment level indicates that segment L1 1215B references segments L0 1215C and segments L0 1215D; and that segment L1 1215F references segments L0 1215G and 1215H. Thus, fingerprints corresponding to L0 segments 1215C, 1215D, 1215G, and 1215H can be identified from the traversal of the last upper segment level (e.g., L1). The identified fingerprints are hashed using the perfect hash function and bits are set in the perfect hash vector corresponding to the hashed fingerprints (see, e.g., loop 1447 and steps 1415, 1420—FIG. 14).

FIG. 17 shows the perfect hash vector in a fourth state, after the third state. In this fourth state, bits at positions 1, 2, 4, and 13 (corresponding to segments L0 1215G, 1215H, 1215C, and 1215D, respectively) have been set as indicated by the binary value 1 in the bit positions. Thus, although a segment is missing (e.g., L0 1215D) there is still a reference (by L1 1215B) to the missing segment. In other words, segment L0 1215D will not be found or be present in any of the containers. A fingerprint corresponding to segment L0 1215D will not be found or be present in the index.

Referring back now to FIG. 10, the process continues from the enumeration phase to the verification phase. As discussed, the verification phase is similar to the enumeration phase, except that bits in the perfect hash vector are now cleared accordingly. Specifically, in a step 1030, the containers are read to identify a second set of fingerprints. The second set of fingerprints correspond to segments that are actually present in the deduplication file system. In other words, the containers are again read to identify fingerprints stored in the containers, e.g., metadata sections of the containers, where each fingerprint corresponds to a segment stored in the data sections of the containers.

In a step 1035, the second set of fingerprints are hashed using the perfect hash vector. In a step 1040, bits are cleared in the perfect hash vector corresponding to positions calculated from hashing the second set of fingerprints.

According to the example shown in FIG. 12, the verification would thus identify fingerprints corresponding to L6 segments 1215A, 1215E; L1 segments 1215B, 1215F; and L0 segments 1215C, 1215G, and 1215H. A fingerprint of L0 segment 1215D, however, would be missing as in this example L0 segment 1215D is missing. For example, as discussed, the segment may be missing due to a bug. Due to the bug, the segment may have been deleted even though there was a reference (L1 segment 1215B) to that segment.

FIG. 18 shows the perfect hash vector in a fifth state, after the fourth state. In this fifth state, bits at positions 1, 2, 3, 4, 7, 9, and 10 (corresponding to segments L0 1215G, 1215H, 1215A, 1215C, 1215E, 1215B, and 1215F, respectively) have been cleared as indicated by the binary value 0 in the bit positions.

Referring back now to FIG. 10, in a step 1045, the perfect hash vector is reviewed to determine whether there are any bits that were set and not cleared. If a bit was set and not cleared, a determination is made that at least one segment is missing (step 1050). In other words, a corruption has been detected. Alternatively, if all bits that were set were also cleared, a determination is made that no segments are missing (step 1055). In other words, a corruption has not been detected.

As shown in the example of FIG. 18, the bit at position 13 has not been cleared as indicated by the binary value 1 in bit position 13. Again, for purposes of explanation, it was assumed that L0 segment 1215D was missing in this example. Since the deduplication file system has failed the verification, further diagnostic procedures and reporting may be performed to, for example, alert the user of a corruption or map the missing segment to the file that it is associated with, and so forth.

More particularly, as shown in the example of FIG. 18, the fingerprint of the missing segment has been mapped to a bit position in the perfect hash vector. However, the perfect hash vector does not include the actual fingerprint. This allows for the perfect hash vector to be very compact. Indeed, given that there may be many billions of fingerprints in the system and that a fingerprint may be about 24 bytes, many terabytes of memory would be required to keep the fingerprints in memory. The perfect hash vector, however, allows for a representation of the fingerprints using much smaller amounts of memory (e.g., 160 gigabytes as compared to many terabytes).

As the hash is a one-way function, i.e., cannot obtain the fingerprint from the bit position, other further or additional techniques may be performed to discover the fingerprint and, more particularly, the file that the missing segment is associated with. For example, in a specific embodiment, a look up of the L0 references (or fingerprints) into the perfect hash vector may be performed. More specifically, the L1 containers may be again walked as L1 segments includes references to L0 segments. The perfect hash function may again be applied to the identified references or fingerprints and the resulting bit positions compared with the perfect hash vector.

In this example, a hash of a fingerprint corresponding to L0 segment 1215C points to position 4 in the perfect hash vector, which is already set at 0. Thus, a determination may be made that 1215C is not the missing segment. A hash of a fingerprint corresponding to L0 segment 1215D points to position 13 in the perfect hash vector. This bit, however, is set at 1. Thus, a determination may be made that 1215D is the missing segment. This technique is much faster than repeatedly accessing the index for fingerprint look ups, retrieving the corresponding containers, and determining that L0 segment 1215D is the missing segment because its fingerprint was not found in the index.

Some benefits of the physical file verification technique is that verification can be performed much faster and more efficiently than previous approaches to verification. For example, the fingerprints or keys are not stored in the perfect hash vector. Fingerprints are not saved in the bit positions of the perfect hash vector. Thus, the perfect hash vector has a much smaller and compact size than a conventional hash table in which the keys are stored in the table. The physical file verification technique is an improvement over cache-based techniques in which various fingerprints may be cached in a least recently used (LRU) memory cache. Such an approach suffers from fingerprints being evicted and thus may require various random seeks for the fingerprints.

As discussed above, in a specific embodiment, the physical file verification technique is probabilistic. That is, there is a chance that a missing segment is not detected. Nonetheless, systems and techniques provide for increasing the probability that a missing segment is detected.

The perfect hash function is a type of hash function that can be dynamically generated. Unlike a conventional hash table in which collisions may occur, the perfect hash function provides a one-to-one mapping between a key (e.g., fingerprint) and a unique bit position in the perfect hash vector. The perfect hash function is a hash function that can map an arbitrary set of keys into unique positions in a fixed size vector. In other words, every segment may be mapped to a unique position in the vector. Every fingerprint can be uniquely represented in the perfect hash vector as the perfect hash function can avoid collision.

For example, FIG. 19 shows an operation of the perfect hash function. A key (e.g., fingerprint) 1905 is input or passed to a perfect hash function 1910 and an output includes a unique bit position 1915 in the perfect hash vector.

The keys or fingerprints to the perfect hash function, however, must be known beforehand in order to "seed" or "train" the perfect hash function and guarantee the one-to-one mapping. The perfect hash function must be "trained." That is, the algorithm must know all the keys before the hash function can be generated for this set of keys. Any key not in this initial set will be mapped randomly into the vector and collision can occur.

In the case of a missing segment, however, that segment's fingerprint is also missing from the fingerprint index. Thus, the fingerprint of the missing segment (e.g., L0 1215D) will not be used to "train" the perfect hash function. As a result, when the fingerprint of the missing segment is hashed, there is a possibility of a collision. That is, the hashed fingerprint of the missing segment may be mapped to a bit position in the perfect vector that happens to correspond to a bit position to which a fingerprint of an existing segment has already been mapped (e.g., maps to a used bit).

For example, FIG. 20 shows a perfect hash vector 2005 in which, for purpose of explanation, a fingerprint of missing L0 segment 1215D is mapped 2010 to the same bit position as L0 segment 1215C (which is present). In other words, L0 segment 1215D maps to a used bit in the perfect hash vector. In this example, FIG. 20 shows a state of the perfect hash vector after the enumeration process in which the upper levels of the segments have been walked to identify the fingerprints of each level. Thus, bit positions 1, 2, 3, 4, 7, 9, and 10 (corresponding to segments L0 1215G, 1215H, 1215A, 1215C (and missing/colliding 1215D), 1215E, 1215B, and 1215F, respectively) have been set (step 1025—FIG. 10) as shown with a binary value of 1 in the bit positions.

FIG. 21 shows the perfect hash vector shown in FIG. 20 after the verification process. In other words, the containers have been read to identify a second set of fingerprints, the second set of fingerprints corresponding to segments that are actually present (step 1030—FIG. 10); the second set of fingerprints have been hashed (step 1035); and bits in the perfect hash vector have been cleared corresponding to positions calculated from hashing the second set of fingerprints (step 1040).

Specifically, as shown in the example of FIG. 21, bits at positions 1, 2, 3, 4, 7, 9, and 10 (corresponding to segments L0 1215G, 1215H, 1215A, 1215C (and missing/colliding 1215D), 1215E, 1215B, and 1215F, respectively) have been cleared as indicated by the binary value 0 in the bit positions. Thus, the perfect hash vector shows all zeros and the missing segment (e.g., L0 2015D) will be undetected during the vector review (step 1045) because the missing segment has been mapped to a used bit position. Thus, a possibility of collision exists because a key (e.g., foreign key or fingerprint) may be passed to the perfect hash function, where the key was not used in creating the perfect hash function. That is, a first possibility is that the fingerprint (e.g., 1215D) collides with an existing fingerprint as shown in the example of FIGS. 20-21; and a second possibility is that the fingerprint (e.g., 1215D) collides with or points into some unused bit as shown in the example of FIGS. 17-18.

In a specific embodiment, the size of the perfect hash vector is increased in order to increase the probability that a missing segment (or fingerprint of the missing segment) will map to an unused bit in the vector and thus be detected.

In some cases, a load factor of 0.7 may be used to yield a good hash function generation time and memory utilization—i.e., for every 7 keys, 10 positions in the vector may be reserved. It is possible to generate a PHVEC with a higher load factor but it can take a long time to create the hash function.

Traditional application of the PHVEC is to create a compact representation of a set of keys. As discussed above, a load factor of 0.7 may be used. However, in a specific embodiment, based on the available memory, the load factor will be set to a minimum for the probabilistic physical file verification (PPFV). That will increase the probability to detect a single missing segment as the probability of collision is equal to p, the load factor. The probability that the missing segment will be caught is therefore 1−p. As p gets smaller, 1−p gets larger, which implies a better chance to catch the problem. In a specific embodiment, the load factor used will be equal to a number of keys divided by a number of bits in available memory, i.e., load factor used in the PPFV algorithm=# of keys/# of bits in available memory.

The probability of detecting at least one missing segment increases as the number of missing segments increase. If, for example, the flaw is bug, it is likely that multiple segments will be affected. For example, one missing segment may collide with a used bit in the perfect hash vector, but there is a very low likelihood of multiple other missing segments also colliding. In other words, as there are more corrupted segments in the file system, the probability of detecting at least one corrupted segment increases. Detecting even just one corrupted segment can be sufficient because the system will then report and the user will then realize that there is a flaw and can then proceed with other measures to diagnose and recover.

In a specific embodiment, a method includes creating a perfect hash function based on a set of keys, each key in the set of keys being uniquely represented in a perfect hash vector of the perfect hash function; and after the creating a perfect hash function, passing a different set of keys to the perfect hash function, each key of the different set of keys not being in the set of keys, wherein a possibility thereby exists of a key in the different set of keys mapping to a same bit position in the perfect hash vector as a key in the set of keys.

The method may include issuing a request to a memory manager of an operating system to allocate all available memory to the perfect hash vector to reduce a probability of the key in the different set of keys mapping to the same bit position in the perfect hash vector as the key in the set of keys. Thus, in a specific embodiment, a size of the perfect hash vector may be calculated dynamically based on the available memory.

The method may include counting a number of keys in the set of keys; and calculating a Y number of bits to be reserved for the perfect hash factor by dividing the number of keys in the set of keys by a load factor, wherein the load factor is less than 0.7. The load factor may be less than or equal to 0.1. The load factor may range from about 0.6 to about 0.1, including, for example, 0.5, 0.4, 0.3, 0.2, less than 0.1, or greater than 0.6. In a specific embodiment, the load factor is at least 0.7, but can be as small as the memory allows including, for example, less than 0.1 (e.g., 0.05). That is, 0.1 is not necessarily the lower bound. The method may include reserving a Y number bits for the perfect hash vector, wherein Y is substantially greater than the number of keys in the set of keys. For example, if the perfect hash function has been seeded with 100 keys (e.g., there are 100 fingerprints in the fingerprint-to-container index), 1000 bits may be reserved for the perfect hash vector (e.g., 100 divided by 0.1 equals 1000).

The method may include: requesting the Y number of bits to be reserved; receiving an indication from a memory manager of an operating system that there is insufficient memory for the Y number of bits; and upon receipt of the indication, generating an alert for a user indicating that there is insufficient memory to verify files in a deduplication file system. In some cases, the user may or may not be permitted to continue with the verification. For example, in an embodiment, the user may choose to override the alert and continue with the verification despite an increased probability of a missing segment being undetected. In another embodiment, the user may be prevented from overriding the alert.

The following is a summary of various points according to one or more embodiments: 1) Segment trees are scanned level by level according to the physical layout of the file system blocks. A complete physical scan of the metadata may take a few hours, whereas the logical scan can take weeks and even months. 2) All the segments are verified in each scan with a very high probability, especially on a less populated system (PHVEC load factor will be very low). 3) This mechanism can provide the second invariance (the segment should exist if there is a live reference to it) on the cloud tier. 4) The same algorithm can be applied to the active tier to replace the current logical file verification. In various specific embodiments, there can be multiple mappings of the same fingerprint to different containers. A requirement is that there is a one to one correspondence between the index and the segment in the container. The perfect hash vector is made larger than the number of keys that it supports to facilitate generating a perfect hash function.

The following includes a further discussion of some disadvantages with prior approaches and benefits provided with the probabilistic file verification algorithm. The default file verification mechanism in many deduplication file systems is a logical walk of each newly created file to make sure all referenced data segments exist in the system. Depending on the workload, this process can lag behind by weeks or months. Furthermore, data can be corrupted after the initial verification but the file system may not be able to afford to check all the files over and over again. Files corrupted after the initial check will not be detected until it is read again by the user, which can be too late.

Segment locality and the deduplication ratio can have severe impact on the performance in logical file verification. For many deduplication file systems, file verification is not even enabled for the cloud tier. The reasons may include: 1) File verification being very slow on the active tier. Adding extra load exacerbates the performance problem. 2) There may be fewer spindles for the cloud tier's meta data. Enumeration of the meta data may be slower than the active tier.

In many cases, data corruption on the cloud tier will not be detected until the file is accessed.

In a specific embodiment, a new algorithm that may be referred to as physical file system consistency checking (PFSCK) is provided that is invariant to both locality and dedup ratio and it can verify the entire system within hours, instead of weeks. Locality refers to a degree of data fragmentation. Fragmentation may be especially prevalent in file systems having a log-structured file system since updating blocks in a file places the new data at an end of the log, wherever it happens to be. Rather, the performance may be determined solely by the physical capacity of the system. Therefore it is predictable and scalable and it can be used to protect the cloud tier as well as the active tier. It can also verifies the entire system each time, instead of just the initial instance of the file.

The following is a brief description of the PFSCK algorithm according to one or more embodiments. In a specific embodiment, the algorithm includes four major steps or phases including: 1. merge; 2. analysis; 3. enumeration; 4. verify; and 5. report.

1. Merge Procedure

All IO to the cloud tier will be disabled and all outstanding data and metadata blocks will be flushed to the cloud storage.

2. Analysis Procedure

The file system index contains all the mappings from a fingerprint key to the CMETA (cloud metadata) container. It is assumed that there is a one to one relationship between the index entry and the actual data segment. That consistency condition may be excluded from the algorithm and may be verified via another mechanism.

If there is no missing data segment, the index will contain all live references in the file system. By iterating all the entries in the index, a PHVEC (perfect hash vector) that represents the entire system can be built. However, if there is any missing segment, it will also be missing in the index (based on the assumption in the above paragraph). The PHVEC will not be able to represent those missing segments. It is possible that those missing fingerprints will be hashed into an unused position or some position that is already used to represent other fingerprints. The latter case is called a collision and it is not possible to distinguish if the bit is set because of the missing fingerprint or other normal fingerprint. The collision introduces error in this algorithm but the error rate in this PFSCK algorithm is extremely low for certain use cases.

3. Enumeration Procedure

Once the PHVEC has been built, the name space will be scanned and all L6 (level 6) fingerprints will be inserted into the live PHVEC. The L6 fingerprints are the root of the metadata segment tree per user file. If the L6 exists, the file is still live and entire LP tree and its corresponding L0 (user data payload) segments are live. Data that are deleted will not be inserted into the live PHVEC as the root L6 will not exist in the namespace.

4. Verification Procedure

If there is no missing segment, all the live references should be a subset of the fingerprints contained in the index (or the data segments in the cloud by the assumed consistency condition). Once the live vector is built, all the CMETA containers are read and if the corresponding fingerprint key is set in the live vector, that bit will be cleared to 0. At the end of the procedure, all the live reference bits should have been cleared and all the bits in the PHVEC should be 0.

If there is a missing segment, the segment's fingerprint will not be known to the PHVEC and it is possible that there is a collision.

In some cases, the load factor used in the PHVEC is 7/10, i.e., for every 7 keys, 10 bits are reserved. However not all the keys in the system are live so the actual load factor is usually smaller. For purposes of explanation in this discussion, the worst case load factor 7/10 will be used.

The probability that a missing segment will collide with another live fingerprint (FP) is therefore 7/10, in which case the bit would have been cleared at the end of the verification procedure and the missing segment cannot be detected.

If there is a missing segment that does not collide with any other segments, the live bit will not be cleared because the segment does not exist in any CMETA containers. The corruption will be detected.

The default 7/10 load factor may be used on other normal operations because memory may be needed for other purposes. In a specific embodiment, in PFSCK, the entire system memory available to the garbage collection (GC) process will be used to build this live PHVEC. For example, on a 25 percent loaded system, this load factor can be improved to less than 7/40=17.5 percent.

Furthermore, in many of the previous missing segment cases hit encountered it has been observed that missing segments always appear in a batch. For example, if there are four missing segments, the chance that at least one of the fingerprints will not collide with any other FP is 1−(7/10)^4=76 percent or 1−(17.5%)^4=99 percent.

The probability that this algorithm can detect a missing segment error approaches 1 very quickly if there are multiple occurrences. Once the corruption is detected, other less performance efficient tools of the deduplication file system can be used to identify the exact files that contain the corruption, e.g., sfs_dump.

5. Report Procedure

If no missing segment is detected, this step is not needed.

If missing segment is found, one or more bit positions in the PHVEC is set to 1. However, there is no reverse mapping from a bit position back to the fingerprint. The LP tree has to be scanned level by level from L6 to L1. If any segment reference is set in the PHVEC, it is a missing segment. The report procedure will collect all these missing segment information and report that to the user.

It is optional for the report procedure to do a reverse physical walk from the missing L0 segments back to the L6 that contain those missing segments. However, the command sfs_dump-G does exactly that. In a specific embodiment, it is sufficient for PFSCK to report the missing fingerprints and let sfs_dump to identify the corrupted files.

As discussed, logical file verification is very inefficient. It is very sensitive to the dedup ratio of the files and data locality. A garbage collection process can rearrange data containers and can cause data corruption but in many cases it is not feasible to verify all the files again and again after each garbage collection cycle due to poor performance. Verifying new files alone can cause a lag of weeks to months.

There is a vast improvement over current PFSCK algorithms. Other algorithms may suffer by requiring a larger memory footprint such that only 25 percent to 50 percent of the data segments can be represented because of memory constraints. The verification therefore cannot cover the entire file system. The memory footprint of a PHVEC is much less and the entire system's data segment can be represented in a PHVEC on various platforms.

As discussed, generally, there is a lack of verification on the cloud tier for many deduplication file systems. Corruption will not be detected until the file is read back. This is a serious issue because customer users expect good deduplication performance and data protection. In a specific embodiment, a consistency verification is provided for the cloud tier. In another specific embodiment, the consistency verification is extended to the active tier. Any storage company that supports deduplication in the file system can potentially benefit from this algorithm. This algorithm scales linearly with the total physical capacity and it can verify all the data in a very large deployment in a few hours instead of weeks.

Table A below shows an example of a flow of a physical file verification (PFV) algorithm for a cloud tier according to one or more embodiments.

TABLE A

| Step | Description |
|---|---|
| 1 | Use all of the available garbage collection (GC) memory to build a PHVEC live vector. In a specific embodiment, GC is configured to use 50 percent of the memory on the system and this memory may be provided to the PHVEC for verification. PHVEC with lower load factor can reduce the error in the algorithm (e.g., reduce the probability of a missing segment being masked by a live segment). |
| 2 | Enumerate namespace and insert all live references into this PHVEC vector |
| 3 | Scan CMETA (containers) for all segments, clear (e.g., unset) the corresponding bit in PHVEC if set. For example, after enumeration, the process includes walking the CSET and unsetting a bit for every segment found in CSET. |
| 4 | Verify that all the PHVEC bits are zero => all the live segments have been accounted for |
| 5 | Report missing segments if any. For example, the process may include walking L1 segments, looking up each L0 reference in the PHVEC, and reporting a missing segment if a PHVEC bit is set for an L0 reference. |

As discussed, PFV is probabilistic. In a specific embodiment, if there is a missing segment, it is not in the index nor the CSET (containers). It is not in the key space of the PHVEC. The fingerprint (FP) of the missing segment can collide with any position in the PHVEC. It can collide with another segment in the PHVEC—the bit will be cleared when the segment is found in the CSET—and thus the missing segment will not be detected. However, it can collide with an unmapped bit—and the PFV will detect the corruption.

Let p be the ratio of bits set in the live vector. The probability that a single missing segment collides with a mapped bit is p. If there are n missing segments, the probability that at least one of them does not collide with anything is $1-p^n$.

For example, if $p=0.7$, $n=10$, $1-p^n=0.97$. The probability that a missing segment is detected is 0.97. A PHVEC may be configured to have $p=0.7$. In a specific embodiment, the system is sized to handle max capacity. For example, if the system is only 25 full, a much smaller load factor, e.g., $0.7/4=0.175$, may be used. A probability of detection with just two instances of corruption is $1-0.175^2=0.97$. In a specific embodiment, instead of a fixed load factor, all the available GC will be used to create a PHVEC with a minimum load factor.

Figure 22:
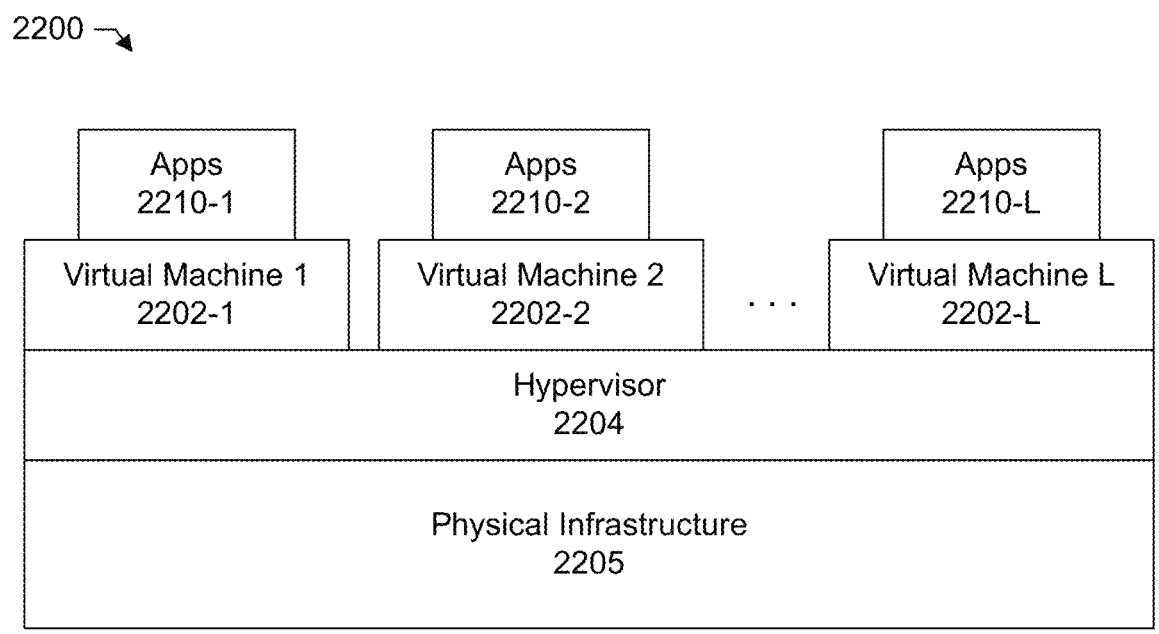
FIG. 22 shows a block diagram of a processing platform that may be utilized to implement at least a portion of an information processing system, according to one or more embodiments.

FIG. 22 shows an example of an information processing platform comprising cloud infrastructure 2200 in which a deduplication file system may be used. The cloud infrastructure 2200 comprises a combination of physical and virtual processing resources that may be utilized to implement at least a portion of information processing system 100 (FIG. 1), the deduplication file system, or both. The cloud infrastructure 2200 comprises virtual machines (VMs) 2202-1, 2202-2, . . . 2202-L implemented using a hypervisor 2204. The hypervisor runs on physical infrastructure 2205. The cloud infrastructure 2200 further comprises sets of applications 2210-1, 2210-2, . . . 2210-L running on respective ones of the virtual machines 2202-1, 2202-2, . . . 2202-L under the control of the hypervisor.

Although only a single hypervisor is shown in the embodiment of FIG. 22, the system may include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement the hypervisor and possibly other portions of the information processing system in one or more embodiments is the VMware® vSphere® which may have an associated virtual infrastructure management system such as the VMware® vCenter™. The underlying physical machines may comprise one or more distributed processing platforms that include one or more storage systems.

Figure 23:
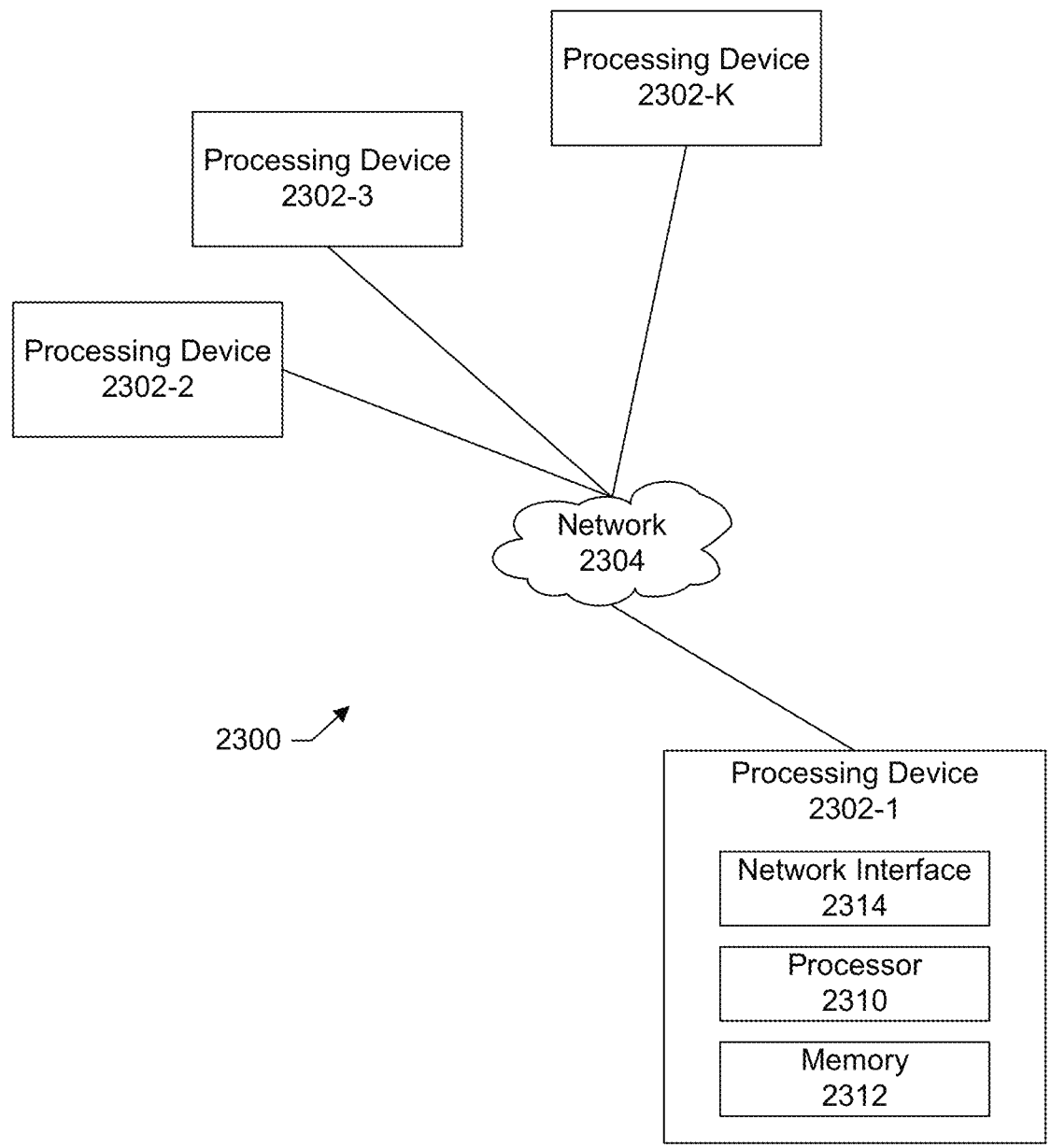
FIG. 23 shows another block diagram of a processing platform that may be utilized to implement at least a portion of an information processing system, according to one or more embodiments.

As is apparent from the above, one or more of the processing modules or other components of the system may each run on a computer, server, storage device or other processing platform element. A given such element may be viewed as an example of what is more generally referred to herein as a "processing device." The cloud infrastructure 2200 shown in FIG. 22 may represent at least a portion of one processing platform. Another example of such a processing platform is processing platform 2300 shown in FIG. 23.

The processing platform 2300 in this embodiment comprises a portion of system 100 and includes a plurality of processing devices, denoted 2302-1, 2302-2, 2302-3, . . . 2302-K, which communicate with one another over a network 2304.

The network 2304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 2302-1 in the processing platform 2300 comprises a processor 2310 coupled to a memory 2312.

The processor 2310 may comprise a microprocessor, a microcontroller, an application-specific integrated circuit (ASIC), a field-programmable gate array (FPGA) or other type of processing circuitry, as well as portions or combinations of such circuitry elements.

The memory 2312 may comprise random access memory (RAM), read-only memory (ROM) or other types of memory, in any combination. The memory 2312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 2302-1 is network interface circuitry 2314, which is used to interface the processing device with the network 2304 and other system components, and may comprise conventional transceivers.

The other processing devices 2302 of the processing platform 2300 are assumed to be configured in a manner similar to that shown for processing device 2302-1 in the figure.

Again, the particular processing platform 2300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 105 are illustratively implemented in the form of software running on one or more processing devices.

Figure 24:
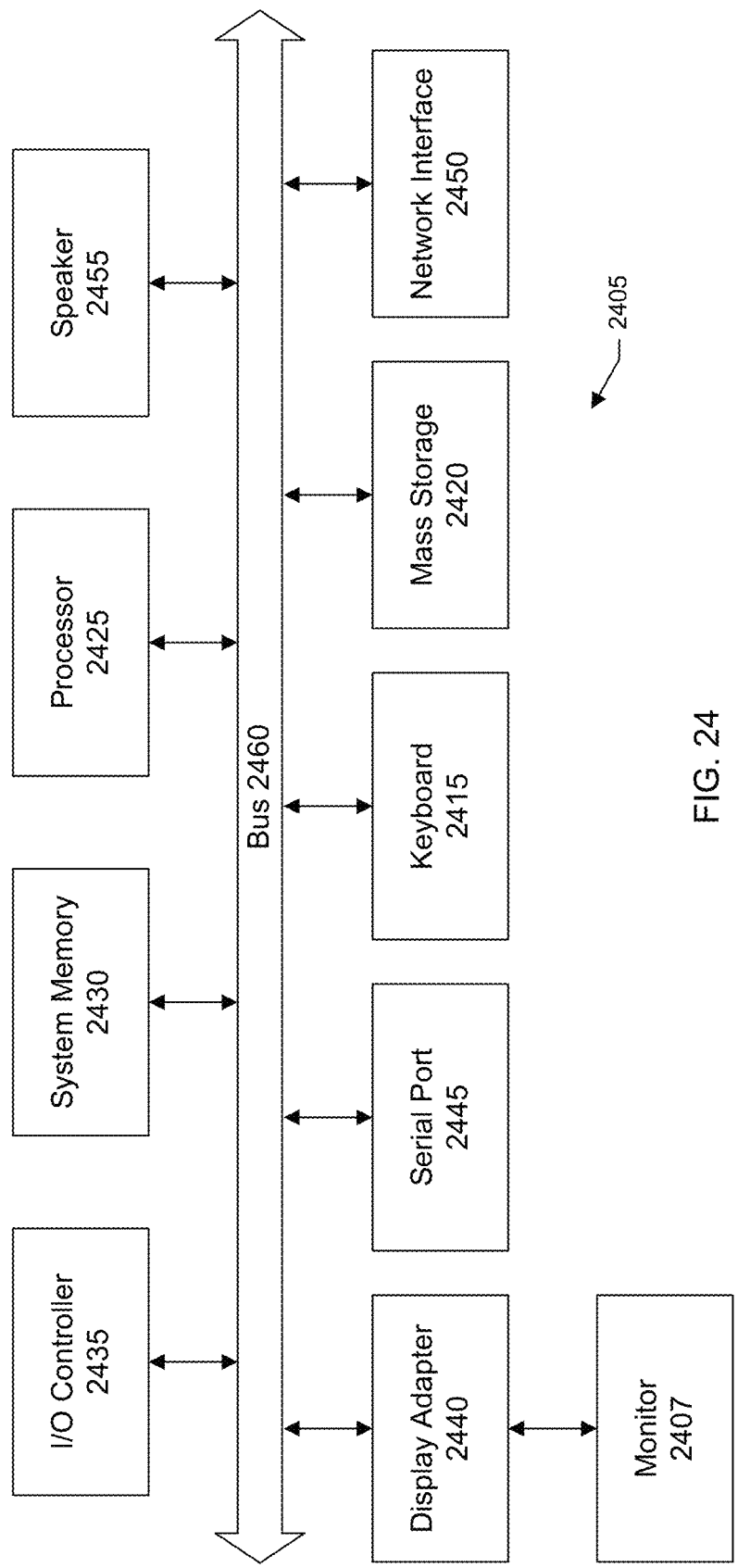
FIG. 24 shows a block diagram of a computer system suitable for use with the system, according to one or more embodiments.

FIG. 24 shows a system block diagram of a computer system 2405 used to execute the software of the present system described herein. The computer system includes a monitor 2407, keyboard 2415, and mass storage devices 2420. Computer system 2405 further includes subsystems such as central processor 2425, system memory 2430, input/output (I/O) controller 2435, display adapter 2440, serial or universal serial bus (USB) port 2445, network interface 2450, and speaker 2455. The system may also be used with computer systems with additional or fewer subsystems. For example, a computer system could include more than one processor 2425 (i.e., a multiprocessor system) or a system may include a cache memory.

Arrows such as 2460 represent the system bus architecture of computer system 2405. However, these arrows are illustrative of any interconnection scheme serving to link the subsystems. For example, speaker 2455 could be connected to the other subsystems through a port or have an internal direct connection to central processor 2425. The processor may include multiple processors or a multicore processor, which may permit parallel processing of information. Computer system 2405 shown in FIG. 24 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers. The variable N and other similar index variables are assumed to be arbitrary positive integers greater than or equal to two.

In a specific embodiment, there is system comprising: a processor; and memory configured to store one or more sequences of instructions which, when executed by the processor, cause the processor to carry out the steps of: creating a perfect hash vector to track segments in a deduplication file system comprising files, segment trees, and containers, the files being represented by the segment trees, the segment trees having multiple segment levels arranged in a hierarchy, and the containers storing the segments, and fingerprints corresponding to the segments; traversing upper-level segments to identify a first set of fingerprints of each level of the segment trees, the first set of fingerprints corresponding to segments that should be present; hashing the first set of fingerprints; setting bits in the perfect hash vector corresponding to positions calculated from hashing the first set of fingerprints; reading the containers to identify a second set of fingerprints stored in the containers, the second set of fingerprints corresponding to segments that are present; hashing the second set of fingerprints; clearing bits in the perfect hash vector corresponding to positions calculated from hashing the second set of fingerprints; reviewing the perfect hash vector to determine whether there are any bits in the perfect hash vector that were set and not cleared; if a bit was set and not cleared, determining that at least one segment is missing from the deduplication file system; and if all bits set were also cleared, determining that no segments are missing from the deduplication file system.

In an embodiment, the processor further carries out the steps of: retrieving the fingerprints from an index mapping the fingerprints to the containers in which the segments are stored, each fingerprint being listed in the index having a corresponding segment stored in a container; seeding a perfect hash function with the fingerprints retrieved from the index to create the perfect hash vector; and sizing the perfect hash vector with a number of bits that is substantially greater than a number of fingerprints in the index, wherein the sizing increases a probability that a fingerprint of a missing segment will map to a bit position in the perfect hash vector that is not also mapped to by a fingerprint of a segment that is present.

In an embodiment, the processor further carries out the steps of: retrieving the fingerprints from an index mapping the fingerprints to the containers in which the segments are stored, each fingerprint being listed in the index having a corresponding segment stored in a container; seeding a perfect hash function with the fingerprints retrieved from the index to create the perfect hash vector; and sizing the perfect hash vector with a number of bits that is substantially greater than a number of fingerprints in the index to decrease a probability of a collision in the perfect hash vector between a fingerprint of a segment that is present and a fingerprint of a segment that is not present but should be present.

In an embodiment, the processor further carries out the steps of: requesting that all available memory be allocated to the perfect hash vector, the perfect hash vector thereby comprising a number of bits that is substantially greater than a count of the fingerprints.

In an embodiment, the processor further carries out the steps of: reading containers storing segments at upper levels of the segment trees; and based on the reading of containers storing segments at the upper levels, identifying fingerprints of the segments at the upper levels, and fingerprints of segments at a lowest level of the segment tree that are referenced by segments at a last upper level of the segment trees. In an embodiment, the perfect hash vector does not store the fingerprints.

In another specific embodiment, there is a method comprising: creating a perfect hash vector to track segments in a deduplication file system comprising files, segment trees, and containers, the files being represented by the segment trees, the segment trees having multiple segment levels arranged in a hierarchy, and the containers storing the segments, and fingerprints corresponding to the segments; traversing upper-level segments to identify a first set of fingerprints of each level of the segment trees, the first set of fingerprints corresponding to segments that should be present; hashing the first set of fingerprints; setting bits in the perfect hash vector corresponding to positions calculated from hashing the first set of fingerprints; reading the containers to identify a second set of fingerprints stored in the containers, the second set of fingerprints corresponding to segments that are present; hashing the second set of fingerprints; clearing bits in the perfect hash vector corresponding to positions calculated from hashing the second set of fingerprints; reviewing the perfect hash vector to determine whether there are any bits in the perfect hash vector that were set and not cleared; if a bit was set and not cleared, determining that at least one segment is missing from the deduplication file system; and if all bits set were also cleared, determining that no segments are missing from the deduplication file system.

In another specific embodiment, there is a computer program product, comprising a non-transitory computer-readable medium having a computer-readable program code embodied therein, the computer-readable program code adapted to be executed by one or more processors to implement a method comprising: creating a perfect hash vector to track segments in a deduplication file system comprising files, segment trees, and containers, the files being represented by the segment trees, the segment trees having multiple segment levels arranged in a hierarchy, and the containers storing the segments, and fingerprints corresponding to the segments; traversing upper-level segments to identify a first set of fingerprints of each level of the segment trees, the first set of fingerprints corresponding to segments that should be present; hashing the first set of fingerprints; setting bits in the perfect hash vector corresponding to positions calculated from hashing the first set of fingerprints; reading the containers to identify a second set of fingerprints stored in the containers, the second set of fingerprints corresponding to segments that are present; hashing the second set of fingerprints; clearing bits in the perfect hash vector corresponding to positions calculated from hashing the second set of fingerprints; reviewing the perfect hash vector to determine whether there are any bits in the perfect hash vector that were set and not cleared; if a bit was set and not cleared, determining that at least one segment is missing from the deduplication file system; and if all bits set were also cleared, determining that no segments are missing from the deduplication file system.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A system comprising: a processor; and memory configured to store one or more sequences of instructions which, when executed by the processor, cause the processor to carry out the steps of:
    creating a perfect hash vector to track segments in a deduplication file system comprising files, segment trees, and containers, the files being represented by the segment trees, the segment trees having multiple segment levels arranged in a hierarchy, and the containers storing the segments, and fingerprints corresponding to the segments;
    traversing upper-level segments to identify a first set of fingerprints of each level of the segment trees, the first set of fingerprints corresponding to segments that should be present;
    hashing the first set of fingerprints;
    setting bits in the perfect hash vector corresponding to positions calculated from hashing the first set of fingerprints;
    reading the containers to identify a second set of fingerprints stored in the containers, the second set of fingerprints corresponding to segments that are present;
    hashing the second set of fingerprints;
    clearing bits in the perfect hash vector corresponding to positions calculated from hashing the second set of fingerprints;
    reviewing the perfect hash vector to determine whether there are any bits in the perfect hash vector that were set and not cleared;
    if a bit was set and not cleared, determining that at least one segment is missing from the deduplication file system; and
    if all bits set were also cleared, determining that no segments are missing from the deduplication file system.

2. The system of claim 1 wherein the processor further carries out the steps of:
    retrieving the fingerprints from an index mapping the fingerprints to the containers in which the segments are stored, each fingerprint being listed in the index having a corresponding segment stored in a container; and
    seeding a perfect hash function with the fingerprints retrieved from the index to create the perfect hash vector.

3. The system of claim 1 wherein the processor further carries out the steps of:
    retrieving the fingerprints from an index mapping the fingerprints to the containers in which the segments are stored, each fingerprint being listed in the index having a corresponding segment stored in a container;
    seeding a perfect hash function with the fingerprints retrieved from the index to create the perfect hash vector; and
    sizing the perfect hash vector with a number of bits that is substantially greater than a number of fingerprints in the index to decrease a probability of a collision in the perfect hash vector between a fingerprint of a segment that is present and a fingerprint of a segment that is not present but should be present.

4. The system of claim 1 wherein the processor further carries out the steps of:
    requesting that all available memory be allocated to the perfect hash vector, the perfect hash vector thereby comprising a number of bits that is substantially greater than a count of the fingerprints.

5. The system of claim 1 wherein the processor further carries out the steps of:
    reading containers storing segments at upper levels of the segment trees; and
    based on the reading of containers storing segments at the upper levels, identifying fingerprints of the segments at the upper levels, and fingerprints of segments at a lowest level of the segment tree that are referenced by segments at a last upper level of the segment trees.

6. The system of claim 1 wherein the perfect hash vector does not store the fingerprints.

7. A method comprising:
    creating a perfect hash vector to track segments in a deduplication file system comprising files, segment trees, and containers, the files being represented by the segment trees, the segment trees having multiple segment levels arranged in a hierarchy, and the containers storing the segments, and fingerprints corresponding to the segments;
    traversing upper-level segments to identify a first set of fingerprints of each level of the segment trees, the first set of fingerprints corresponding to segments that should be present;
    hashing the first set of fingerprints;
    setting bits in the perfect hash vector corresponding to positions calculated from hashing the first set of fingerprints;
    reading the containers to identify a second set of fingerprints stored in the containers, the second set of fingerprints corresponding to segments that are present;
    hashing the second set of fingerprints;
    clearing bits in the perfect hash vector corresponding to positions calculated from hashing the second set of fingerprints;
    reviewing the perfect hash vector to determine whether there are any bits in the perfect hash vector that were set and not cleared;
    if a bit was set and not cleared, determining that at least one segment is missing from the deduplication file system; and
    if all bits set were also cleared, determining that no segments are missing from the deduplication file system.

8. The method of claim 7 comprising:
    retrieving the fingerprints from an index mapping the fingerprints to the containers in which the segments are stored, each fingerprint being listed in the index having a corresponding segment stored in a container;

seeding a perfect hash function with the fingerprints retrieved from the index to create the perfect hash vector; and sizing the perfect hash vector with a number of bits that is substantially greater than a number of fingerprints in the index, wherein the sizing increases a probability that a fingerprint of a missing segment will map to a bit position in the perfect hash vector that is not also mapped to by a fingerprint of a segment that is present.

9. The method of claim 7 comprising:

retrieving the fingerprints from an index mapping the fingerprints to the containers in which the segments are stored, each fingerprint being listed in the index having a corresponding segment stored in a container;

seeding a perfect hash function with the fingerprints retrieved from the index to create the perfect hash vector; and sizing the perfect hash vector with a number of bits that is substantially greater than a number of fingerprints in the index to decrease a probability of a collision in the perfect hash vector between a fingerprint of a segment that is present and a fingerprint of a segment that is not present but should be present.

10. The method of claim 7 comprising:

requesting that all available memory be allocated to the perfect hash vector, the perfect hash vector thereby comprising a number of bits that is substantially greater than a count of the fingerprints.

11. The method of claim 7 comprising:

reading containers storing segments at upper levels of the segment trees; and based on the reading of containers storing segments at the upper levels, identifying fingerprints of the segments at the upper levels, and fingerprints of segments at a lowest level of the segment tree that are referenced by segments at a last upper level of the segment trees.

12. The method of claim 7 wherein the perfect hash vector does not store the fingerprints.

13. A computer program product, comprising a non-transitory computer-readable medium having a computer-readable program code embodied therein, the computer-readable program code adapted to be executed by one or more processors to implement a method comprising:

creating a perfect hash vector to track segments in a deduplication file system comprising files, segment trees, and containers, the files being represented by the segment trees, the segment trees having multiple segment levels arranged in a hierarchy, and the containers storing the segments, and fingerprints corresponding to the segments;

traversing upper-level segments to identify a first set of fingerprints of each level of the segment trees, the first set of fingerprints corresponding to segments that should be present;

hashing the first set of fingerprints;

setting bits in the perfect hash vector corresponding to positions calculated from hashing the first set of fingerprints;

reading the containers to identify a second set of fingerprints stored in the containers, the second set of fingerprints corresponding to segments that are present;

hashing the second set of fingerprints;

clearing bits in the perfect hash vector corresponding to positions calculated from hashing the second set of fingerprints;

reviewing the perfect hash vector to determine whether there are any bits in the perfect hash vector that were set and not cleared;

if a bit was set and not cleared, determining that at least one segment is missing from the deduplication file system; and if all bits set were also cleared, determining that no segments are missing from the deduplication file system.

14. The computer program product of claim 13 wherein the method comprises:

retrieving the fingerprints from an index mapping the fingerprints to the containers in which the segments are stored, each fingerprint being listed in the index having a corresponding segment stored in a container;

seeding a perfect hash function with the fingerprints retrieved from the index to create the perfect hash vector; and sizing the perfect hash vector with a number of bits that is substantially greater than a number of fingerprints in the index, wherein the sizing increases a probability that a fingerprint of a missing segment will map to a bit position in the perfect hash vector that is not also mapped to by a fingerprint of a segment that is present.

15. The computer program product of claim 13 wherein the method comprises:

retrieving the fingerprints from an index mapping the fingerprints to the containers in which the segments are stored, each fingerprint being listed in the index having a corresponding segment stored in a container;

seeding a perfect hash function with the fingerprints retrieved from the index to create the perfect hash vector; and sizing the perfect hash vector with a number of bits that is substantially greater than a number of fingerprints in the index to decrease a probability of a collision in the perfect hash vector between a fingerprint of a segment that is present and a fingerprint of a segment that is not present but should be present.

16. The computer program product of claim 13 wherein the method comprises:

requesting that all available memory be allocated to the perfect hash vector, the perfect hash vector thereby comprising a number of bits that is substantially greater than a count of the fingerprints.

17. The computer program product of claim 13 wherein the method comprises:

reading containers storing segments at upper levels of the segment trees; and based on the reading of containers storing segments at the upper levels, identifying fingerprints of the segments at the upper levels, and fingerprints of segments at a lowest level of the segment tree that are referenced by segments at a last upper level of the segment trees.

18. The computer program product of claim 13 wherein the perfect hash vector does not store the fingerprints.

* * * * *